US006914691B1

(12) United States Patent
Sato

(10) Patent No.: US 6,914,691 B1
(45) Date of Patent: Jul. 5, 2005

(54) IMAGE PROCESSING APPARATUS, DATA PROCESSING METHOD, AND STORAGE MEDIUM

(75) Inventor: Akihiko Sato, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,738

(22) Filed: Nov. 26, 1999

(30) Foreign Application Priority Data

Nov. 27, 1998 (JP) .......................................... 10-337257
Dec. 28, 1998 (JP) .......................................... 10-374396

(51) Int. Cl.$^7$ ............................ G06F 3/12; G06F 15/00
(52) U.S. Cl. .................................... 358/1.15; 358/1.14
(58) Field of Search ............................... 358/1.9, 1.15, 358/1.16, 1.13, 1.18, 1.17, 296, 1.14, 1.2, 1.1; 382/180, 294, 140, 232, 233, 100

(56) References Cited

U.S. PATENT DOCUMENTS

| | | | | |
|---|---|---|---|---|
| 5,428,529 A | * | 6/1995 | Hartrick et al. ............. | 715/513 |
| 5,444,779 A | * | 8/1995 | Daniele ...................... | 399/366 |
| 5,509,070 A | * | 4/1996 | Schull ......................... | 705/54 |
| 5,745,569 A | * | 4/1998 | Moskowitz et al. .......... | 705/58 |
| 5,822,436 A | * | 10/1998 | Rhoads ........................ | 380/54 |
| 5,832,119 A | * | 11/1998 | Rhoads ....................... | 382/232 |
| 5,862,260 A | * | 1/1999 | Rhoads ....................... | 382/232 |
| 6,086,706 A | * | 7/2000 | Brassil et al. ................ | 156/277 |
| 6,122,403 A | * | 9/2000 | Rhoads ....................... | 382/233 |
| 6,233,684 B1 | * | 5/2001 | Stefik et al. ................. | 713/176 |
| 6,298,446 B1 | * | 10/2001 | Schreiber et al. ........... | 713/201 |
| 6,311,214 B1 | * | 10/2001 | Rhoads ....................... | 709/217 |
| 6,324,573 B1 | * | 11/2001 | Rhoads ....................... | 709/217 |
| 6,366,685 B1 | * | 4/2002 | Takaragi ...................... | 382/140 |
| 6,542,927 B2 | * | 4/2003 | Rhoads ........................ | 709/217 |
| 2002/0012443 A1 | * | 1/2002 | Rhoads et al. .............. | 382/100 |
| 2002/0057449 A1 | * | 5/2002 | Chapman et al. .......... | 358/1.15 |
| 2002/0120849 A1 | * | 8/2002 | McKinley et al. .......... | 713/176 |
| 2002/0196272 A1 | * | 12/2002 | Ramos et al. ................ | 345/738 |
| 2003/0050961 A1 | * | 3/2003 | Rodriguez et al. .......... | 709/203 |
| 2003/0105721 A1 | * | 6/2003 | Ginter et al. ................. | 705/54 |

FOREIGN PATENT DOCUMENTS

JP 2000253241 A * 9/2000 ............ H04N/1/40

OTHER PUBLICATIONS

Zhao,Jian, International Proceesing of the European Conference on Multimedia Applications, Services, and Techniques, Louvain La Neuve, Belgium, May 1996.*

* cited by examiner

*Primary Examiner*—Scott A. Rogers
(74) *Attorney, Agent, or Firm*—Fitzpatrick, Cella, Harper & Scinto

(57) ABSTRACT

The present invention provides an image processing system which can make switch-over between a copy-permitted state and a copy-prohibited state automatically according to the type of production while securely protecting the production.

For the purpose, the system causes a detecting portion to detect the presence of predetermined information (i.e., production information) in image data, when that image data is sent from a user side terminal to be output from an output device. If the results of this detection indicate its presence, the system prohibits outputting of that image data from the output device. With this, the system releases an output-prohibited state of the above-mentioned image data based on the results of comparison between a password sent from the user side terminal and a password present in that image data.

16 Claims, 21 Drawing Sheets

FIG. 7A
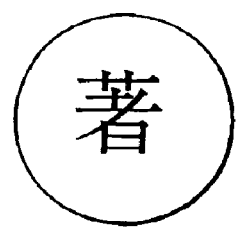
FIG. 7B
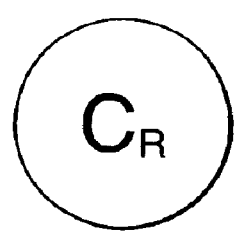
FIG. 7C
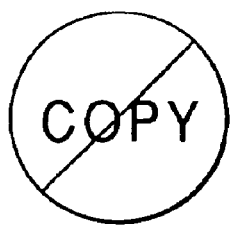
FIG. 7D
FIG. 7E
THIS IMAGE CAN NOT COPIED BECAUSE OF PRODUCTION

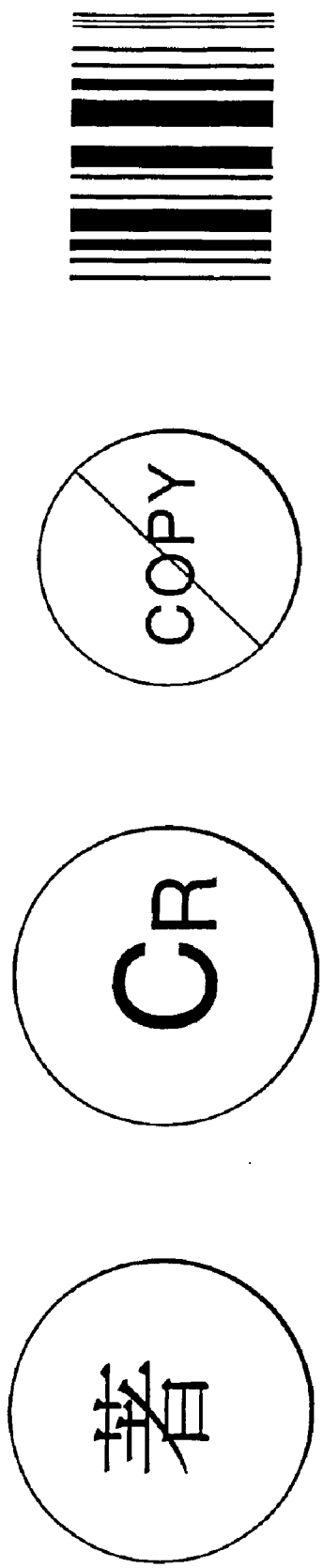

FIG. 22

DO YOU WANT IMAGES RELATING TO DETECTED IMAGE DATA WHICH YOU WANT TO PRINT ?

( YES )   ( NO )

FIG. 23

IMAGE NAME   O O O

| PRODUCE NUMBER | PRODUCE NAME | AMOUNT |
|---|---|---|
| 1. | ——————— | ¥ 000 |
| 2. | ——————— | ¥ 000 |
| ⋮ | | |

CREDIT CARD NO. ———————

( SEND )   ( STOP )

IMAGE PROCESSING APPARATUS, DATA PROCESSING METHOD, AND STORAGE MEDIUM

BACKGROUND OF THE INVENTION

1. Field of the Invention

The present invention relates to an image processing apparatus, a data processing method, and a storage medium.

2. Related Background Art

There has been no conventional means to prevent production given in digital information from being copied illegally or no means established to essentially protect production. For example, a conventional image processing system which comprises a print controller which receives image data coded in a page-description language from a host computer and converts the data into raster image data and then sends it to an image forming device and the image forming device which forms images based on the image data thus sent from the print controller has no means to recognize image data sent from the print controller even if it is production, thus being unable to prevent such production from being copied illegally.

In the recent background that has strengthened legal protection of production given in digital information, a technological method is required to legally prevent illegal copying of production by use of a copying machine, printer, etc.

On the other hand, however, the copyright of some production can be bought from the author to output it with permission from him.

Such production needs to be released from its prohibition state of the image data protected (i.e., copy-protected) based on production information, which has not been taken into account. Therefore, there have been such cases that even with permission obtained from the author, his production cannot be output.

Also, there has not been discussed fully about technologies to provide other pieces of production relating to one production based on its information obtained.

SUMMARY OF THE INVENTION

In view of the above, it is an object of the present invention to provide an image processing device, a data processing method, and a storage medium that have solved the above-mentioned problems.

Another object of the present invention is to provide such an image processing device that can appropriately process production and a method for processing data as well as a storage medium for this purpose.

An appropriate example of the present invention is written in a claim 1.

Still another object of the present invention is to provide such an image processing apparatus that has a novel function and a data processing method as well as a storage medium for this purpose.

The other objects and features of the present invention will be apparent from the following description on the embodiment with reference to the appended drawings.

BRIEF DESCRIPTION OF THE DRAWINGS

FIGS. 7A, 7B, 7C, 7D and 7E show examples of a mark and a character string which indicate being production;

FIGS. 14A, 14B, 14C, 14D and 14E illustrate examples of a mark and a character string which indicate being production;

FIG. 22 shows a display example of the eighth embodiment; and

FIG. 23 is another display example of the eighth embodiment.

DESCRIPTION OF THE PREFERRED EMBODIMENTS

First Embodiment

Figure 1:
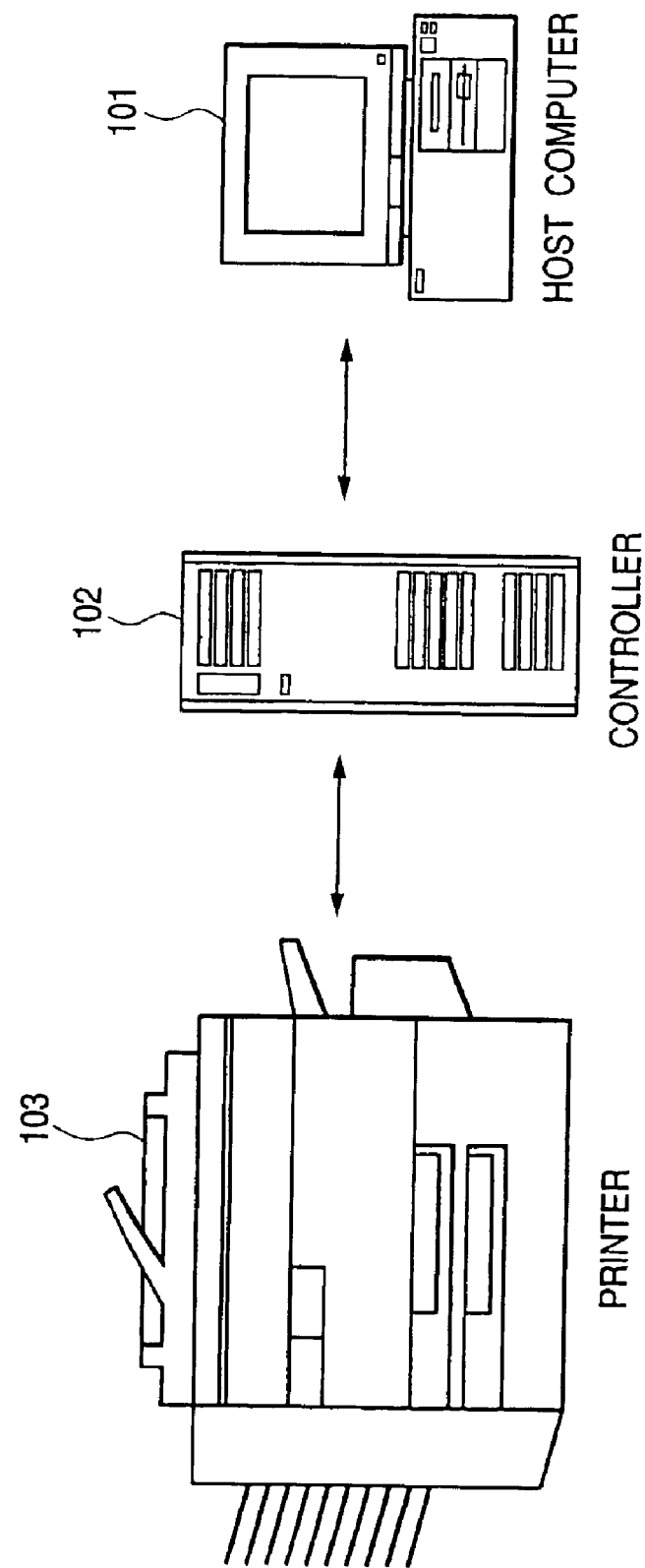
FIG. 1 shows outer appearances of a configuration of an image processing system according to one embodiment of the present invention.

FIG. 1 shows outer appearances of a configuration of an image processing system according to one embodiment of the present invention.

In the figure, a reference numeral 101 indicates a host computer and a numeral 102 indicates a print controller (i.e., controller). A numeral 103 indicates an image forming device (i.e., printer), which color-copies a manuscript mounted on a manuscript station and also outputs images sent from a host computer 101 via the printer controller.

The host computer 101 converts image data into information coded in the page description language (PDL) and then sends it via a connecting cable to the print controller 102.

The print controller 102 then translates PDL data sent from the host computer 101 and executes raster image processing to convert the PDL data into raster image data, which is subsequently sent via the connecting cable to an image forming device 103 to provide the corresponding images.

Figure 2:
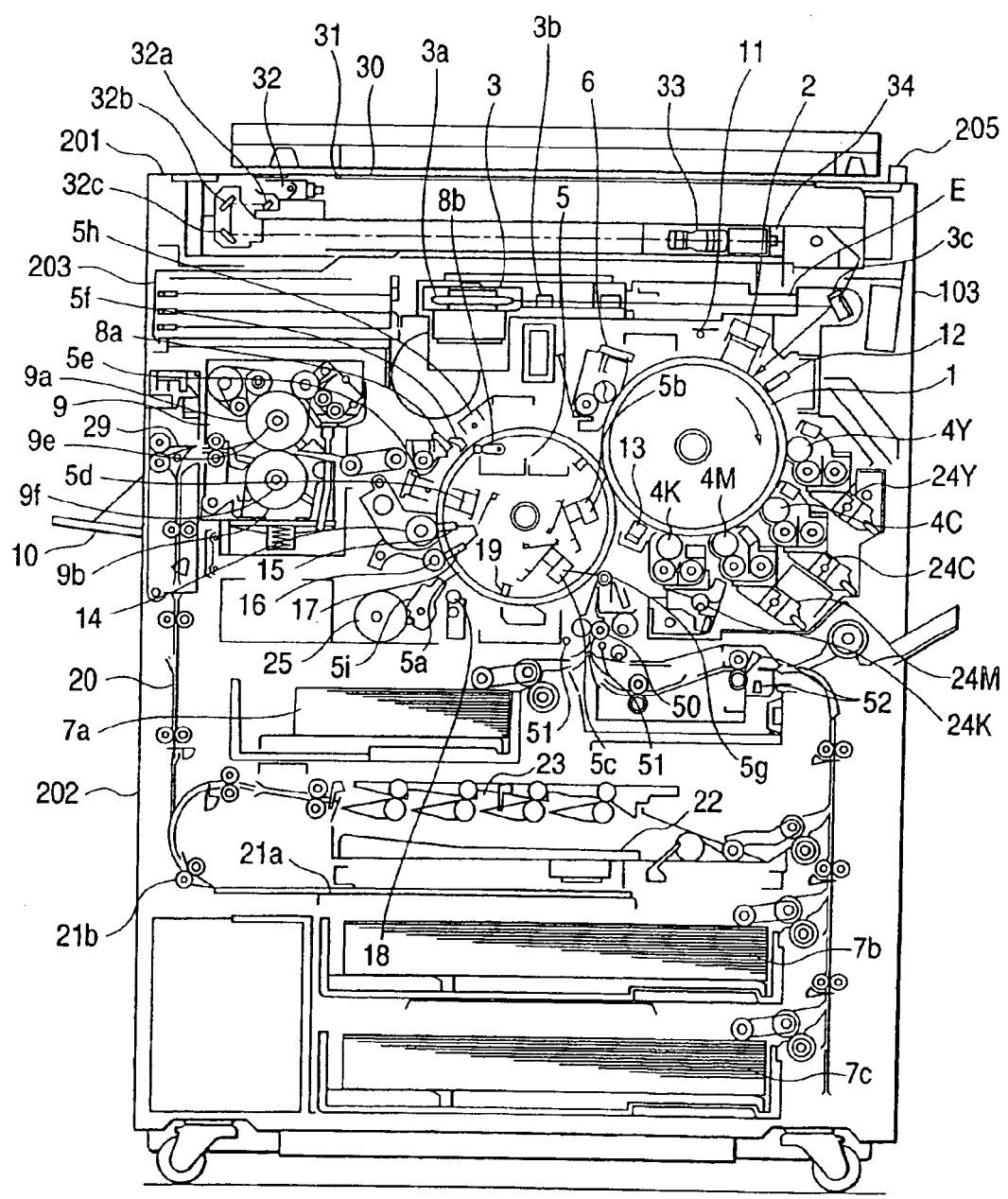
FIG. 2 is a cross-sectional view of a configuration of an image processing device shown in FIG. 1.

FIG. 2 is a cross-sectional view of a configuration of the image processing device 103 shown in FIG. 1, which comprises: a digital-color image reader unit (hereafter called reader unit) 201 at its top; a printer engine unit (hereinafter called engine unit) 202; and an image processing unit 203 set between the reader unit 201 and the engine unit 202.

The following will describe the configuration of the image forming device 103 and the operations of copying manuscript images as a copying machine.

In the figure, when a manuscript is mounted on a manuscript station glass surface 31 and a copy start is executed, illumination is reciprocated in a predetermined direction to collect a light reflected on the manuscript at a full-color sensor 34 formed integrally with an RGB three-color resolving filter through a lens 33 via mirrors 32a, 32b, and 32c, to obtain a color-resolving image analog signal. The color-resolving image analog signal is digitized at an amplifier circuit (not shown) and processed at an image processing unit and then sent to the engine unit 202. A numeral 205 indicates an operating unit, which is provided with a display unit and various keys (neither of which is shown), to give various settings and instructions to the image forming device 103.

At the engine unit 202, an image-carrying photosensitive drum 1 is carried rotationally in an arrow direction, around which are arranged a pre-exposure lamp 11, a corona charger 2, a laser-exposure optical system 3, a potential sensor 12, four developers (yellow developer 4Y, cyan developer 4C, magenta developer 4M, black developer 4K), a drum-mounted light-quantity detecting sensor 13, a transfer device 5, and a cleaner 6.

In the laser-exposure optical system, an image signal from the reader unit 201 is converted at a laser-output unit (not shown) into a light signal, so that thus converted laser light is reflected on the polygonal mirror 3a and passes through the lens 3b and the mirror 3c to be projected onto the surface of the photosensitive drum 1.

When an image is formed by the engine unit 202, the photosensitive drum is rotated in the arrow direction to discharge the drum surface with the pre-exposure lamp 11 and then charge it uniformly with the corona charger 2, in order to subsequently illuminating a light image E for each resolving color so as to form a latent image on the photosensitive drum 1.

Next, the predetermined developers (4Y, 4M, 4C, and 4K) are operated to develop the latent image on the photosensitive drum 1, thus forming a toner image having resin as its base, on the photosensitive drum 1. These developers (4Y, 4M, 4C, and 4K) are each caused by eccentric cams 24Y, 24C, 24M, and 24K respectively to approach the photosensitive drum 1 for each resolving color.

Next, the toner image developed on the photosensitive drum 1 passes through a recording-material cassette 7a and an intermediate tray 22 or recording-material trays 7b and 7c and then detection/conveying systems 50–52 and a transfer device 5 and then is transferred onto a recording material 7 (7a, 7b, and 7c) supplied at a position opposing the photosensitive drum 1.

In this embodiment also, the transfer device 5 comprises a transfer drum 5a given as a recording-material holding means, a transfer charger 5b, a sucking roller 5g opposing an absorbing charger 5c for electro-statistically sucking the recording material 7, an internal charger 5d, an outside charger 5e, and a cam-follower 5i, in such a configuration that a recording-material carrying sheet 5f made of a dielectric is extended and integrally formed in a peripheral opening region of the transfer drum 5a axially supported so as to be driven rotationally. The recording-material carrying sheet 5f comes in a dielectric sheet (hereinafter called transfer sheet) made of a polycarbonate film etc.

As the transfer drum 5a is rotated, the toner image on the photosensitive drum 1 is transferred onto the recording material 7 carried on the recording-material carrying sheet 5f.

Thus, on the recording material 7 which is sucked and conveyed by the recording-material carrying sheet 5f, a desired color image is transferred to form a full-color image.

In the case of forming a full-color image, the recording material 7 on which a four-color toner image has transferred is separated from the transfer drum 5a by a separation claw 8a and then from the transfer sheet 5f by as separating-and-lifting roller 8b and a separating charger 5h and then ejected from a tray 10 via a thermal roller fixing device (hereinafter called fixing device).

Also, the photosensitive drum 1 after completion of transfer is cleaned of residual surface toner with the cleaner 6 and then sent to the image forming step again.

At the fixing device 9, a reference numeral 9g indicates a conveyor belt, which conveys to the fixing device 9 the recording material 7 separated from the transfer device 5. Numerals 9e and 9f indicate heaters, which heat an upper roller 9a and an lower roller 9b.

When an image is formed on the surface of a recording material 7, on the other hand, the recording material 7 is provided with an image formed on its one surface is ejected from the fixing device 9 and, immediately after that, a conveying-path switching guide 29 is driven to cause the recording material 7 to pass through a conveying path 20 and be introduced once onto a reversing path 21a, and when a reversing roller 21b rotates in a reverse direction, the recording material 7 is taken out starting from its rear end thus taken in last, in a direction opposite to that it has been taken in. Then, the above-mentioned image forming step is executed again, to form an image on the other surface.

Also, to prevent the scattering and sticking of a fine particle on the recording-material carrying sheet 5f of the transfer drum 5 and the sticking of oil on the recording material 7, they are cleaned by using a fur brush 14 and a backup fur brush opposing each other via the recording-material carrying sheet 5f, an oil-cleaning roller 16 and an oil-cleaning backup brush 17 opposing each other via the recording-material carrying sheet 5f, or a polishing roller 18 and a polishing roller backup brush 19 opposing each other via the recording-material carrying sheet 5f. Such cleaning is carried out before or after image formation and every time when jamming (of paper) occurred. Also, in the configuration of this embodiment, the eccentric cam 25 is operated at desired timing to work the cam follower 51 formed integrally with the transfer drum 5a, thus making it possible to arbitrarily set a gap between the recording-material carrying sheet 5f and the photosensitive drum 1. For example, at the standby or power-off, the gap is enlarged between the transfer drum 5a and the photosensitive drum 1.

Figure 3:
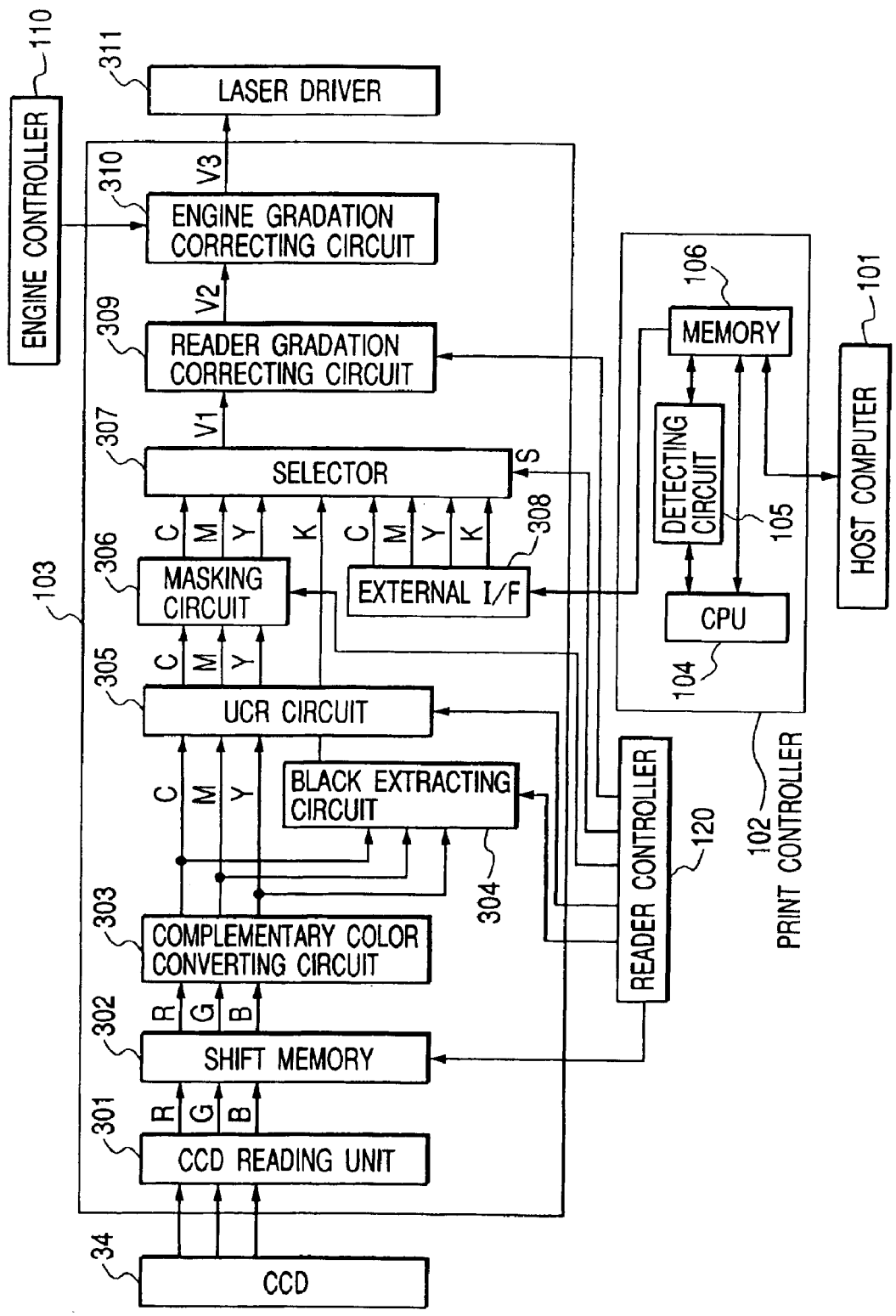
FIG. 3 is a block diagram of a configuration of an image processing unit shown in FIG. 2.

FIG. 3 is a block diagram of a configuration of the image processing unit shown in FIG. 2.

In the figure, a reference numeral 301 indicates a CCD reading unit, which comprises an amplifier for amplifying each of analog RGB signals input from the CCD34 shown in FIG. 2, an A/D converter for converting the analog RGB signals into for example 8-bit digital signals, and a shading correcting circuit for correcting known shading, etc., thus outputting digital RGB signals of a manuscript image.

A numeral 302 indicates a shift memory, which corrects a shift for example between colors and picture elements of an RGB image signal input from the CCD reading unit in response to a shift-quantity control signal sent from the reader controller 120. A numeral 303 indicates a complementary-color converting circuit, which converts an RGB image signal input from the shift memory 302 into an MCY image signal. A numeral 304 indicates a black-extracting circuit, which responds to a black-extracting signal input from the reader controller 120, to extract a black region of an image from MCY (magenta, cyan, and yellow) image signals input from the complementary-color converting circuit 303 and then output a K (black) image signal for thus extracted black region.

A numeral 305 indicates a UCR circuit, which responds to the K image signal input from the black-extracting circuit 304 and the UCR-quantity control signal input from the reader controller 120, to execute under-color removing (UCR) processing on the MCY image signal input from the complementary-color converting circuit 303. That is, the black-extracting circuit 304 and the UCR circuit 305 do not superpose thus extracted black region onto 3-color (M, C, and Y) toner but replace it with K toner, thus improving the color reproduction performance.

The K image signal output from the black-extracting circuit 304 is given as: $K = A \times \min(C2, Y2, M2)$.

Where, A indicates a black-extracting coefficient and C2, Y2, and M2 respectively indicate M, C, and Y image signals output from the complementary-color converting circuit 303. The black-extracting coefficient A is determined by the black-extracting quantity control signal specified by the reader controller 120.

MCY image signals (M1, C1, Y1) output from the UCR circuit 305 are determined as: $M1 = B1 \times (M2 - D1 \times K)$, $C1 = B2 \times (C2 - D2 \times K)$, and $Y1 = B2 \times (Y2 - D3 \times K)$.

Note here that M2, C2, and Y2 represent MCY signals output from the complementary-color converting circuit 303, and coefficients B1, B2, B3, D1, D2, and D3 are determined by the UCR-quantity control signal from the reader controller 120.

Next, a numeral 306 indicates a masking circuit, which executes masking processing on MCY image signals input from the UCR circuit 305 in response to a masking-coefficient control signal input from the reader controller 120, to remove turbidity of the toner used and correct the RGB filter properties of the CCD. The MCY image signals (M0, C0, Y0) output from the masking circuit 306 are expressed as follows:

$$\begin{pmatrix} M0 \\ C0 \\ Y0 \end{pmatrix} = \begin{pmatrix} a11 & a12 & a13 \\ a21 & a22 & a23 \\ a31 & a32 & a33 \end{pmatrix} \begin{pmatrix} M1 \\ C1 \\ Y1 \end{pmatrix}$$ (Matrix 1)

where a11 through a33 indicate masking coefficients, which are determined by the masking-coefficient control signal specified by the reader controller 120; and M1, C1, and Y1 indicate MCY image signals output from the UCR circuit 305.

A numeral 307 indicates a selector, which selects a one-color image signal, and outputs an image signal V1, of the M, C, Y, and K image signals input from the masking circuit 306 and the black-extracting circuit 304 in response to the color-selecting signal input from the reader controller to a selecting terminal S and the M, C, Y, and K image signals input from the print controller 102 via an external interface (I/F) circuit 308.

Figure 4:
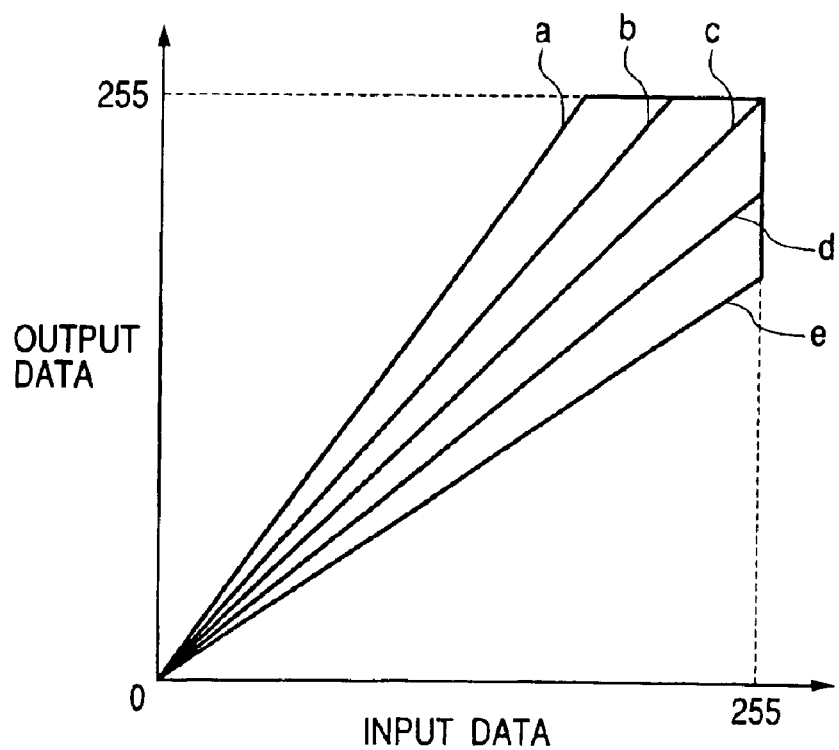
FIG. 4 is a property graph of one example of a gradation correction property of an input/output signal at a reader gradation correcting circuit shown in FIG. 3.

A numeral 309 indicates a reader-gradation correcting circuit, which executes such gradation correction as shown in FIG. 4 on an image signal V1 input from the selector 307 and then outputs an image signal V2. For example, the reader-gradation correcting circuit 309 executes color-density correction using either one of the conversion properties a through e (described later with reference to FIG. 4) which are selected based on a gradation-correction selecting signal specified by the reader controller 120. The setting by this reader-gradation correcting circuit 309 is determined by the setting of image color-density by the copying-machine operating unit.

A numeral 310 indicates a gradation correcting circuit, which corrects an image signal by selecting either one of the gamma-conversion properties M, C, Y, and K (described later with reference to FIG. 5) according to an engine-color selecting signal input from an engine controller 110, to linearize the output property of an engine unit 202 for each color.

A numeral 311 indicates a laser driver, which is included in the laser-exposure optical system 3. The laser driver 311 modulation-drives a semiconductor laser based on an image signal V3 input from the engine-gradation correcting circuit 310, to form a latent image on the photosensitive drum 1.

Also, the image processing unit 203 comprises a CPU, ROMs, and RAMs (none of which is shown), to cause the CPU to govern the entire image processing unit 203 based on a program stored in the ROMs. The RAMs here are used as a work region for the CPU.

In the print controller 102, a CPU indicated by a numeral 104 governs the entire print controller 102 based on a program stored in a memory 106 or a storage medium (not shown). A numeral 105 indicates a detecting circuit, which executes copyright-information detecting processing describe later and outputs an image-output prohibition signal. Also, the memory 106 is used as a work region for the CPU 104 and as a storage region for image data transferred by the host computer 101 and the image-output prohibition signal output from the detecting circuit 105.

The following will describe the operations of the system including the print controller 102.

Expansion of PDL data refers to an operation of expanding PDL data to a full-color image by use of the host computer 101 and then writing it into the memory 106 of the print controller 102. This full-color image is stored, in agreement with the image forming device 103, into the memory 106 as image data which is color-resolved into four colors of M, C, Y, and K. Note here that this memory 106 stores also the image-output prohibition signal detected at the detecting circuit 105 which executes copyright-information detecting processing which is described later. The image-output prohibition signal is read out together with image data resolved into four colors from the memory 106 and sent to the image forming device 103.

If, in this case, the image-output prohibition signal is not generated, image data sent to the image forming device is printed out, during which a full-color image stored in the memory 106 is read out in synchronization with the rotation of the photosensitive drum 1 and then sent to the laser driver 311. These operations are controlled by the CPU 104 of the print controller 102.

FIG. 4 shows one example of the gradation-correction property of an input/output signal at the reader-gradation correcting circuit 309, in which the horizontal axis corresponds to the input signal (input data) and the vertical axis, to the output signal (output data).

Figure 5:
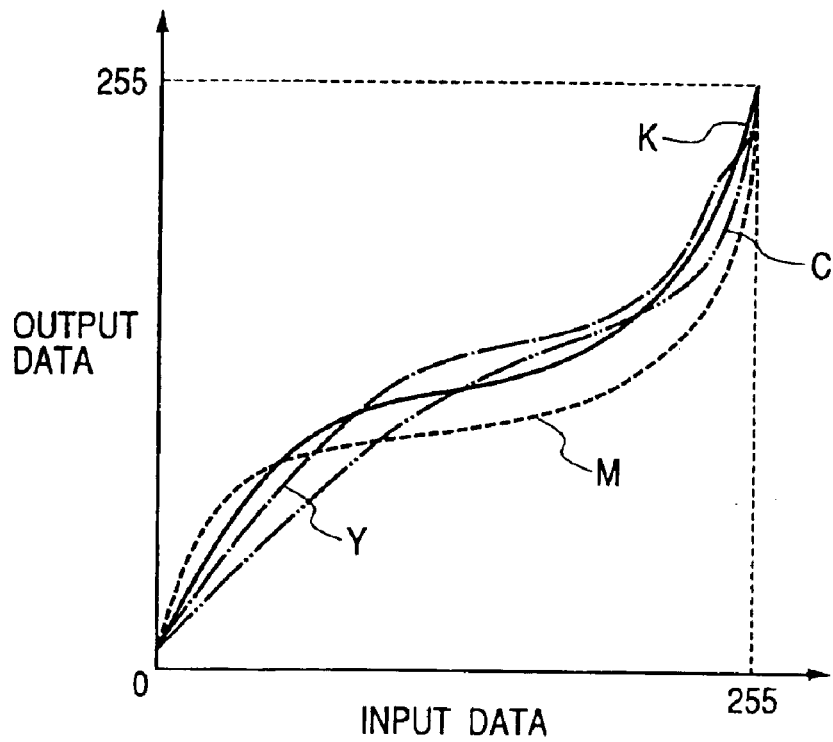
FIG. 5 is a property graph of one example of an input/output signal at an engine gradation correcting circuit.

FIG. 5 shows one example of the gradation-correcting property of an input/output signal at the engine-gradation correcting circuit 310, in which the horizontal axis corresponds to the input signal (input data) and the vertical axis, to the output signal (output data).

The following will describe the operation of processing PDL data at the print controller 102.

Figure 6:
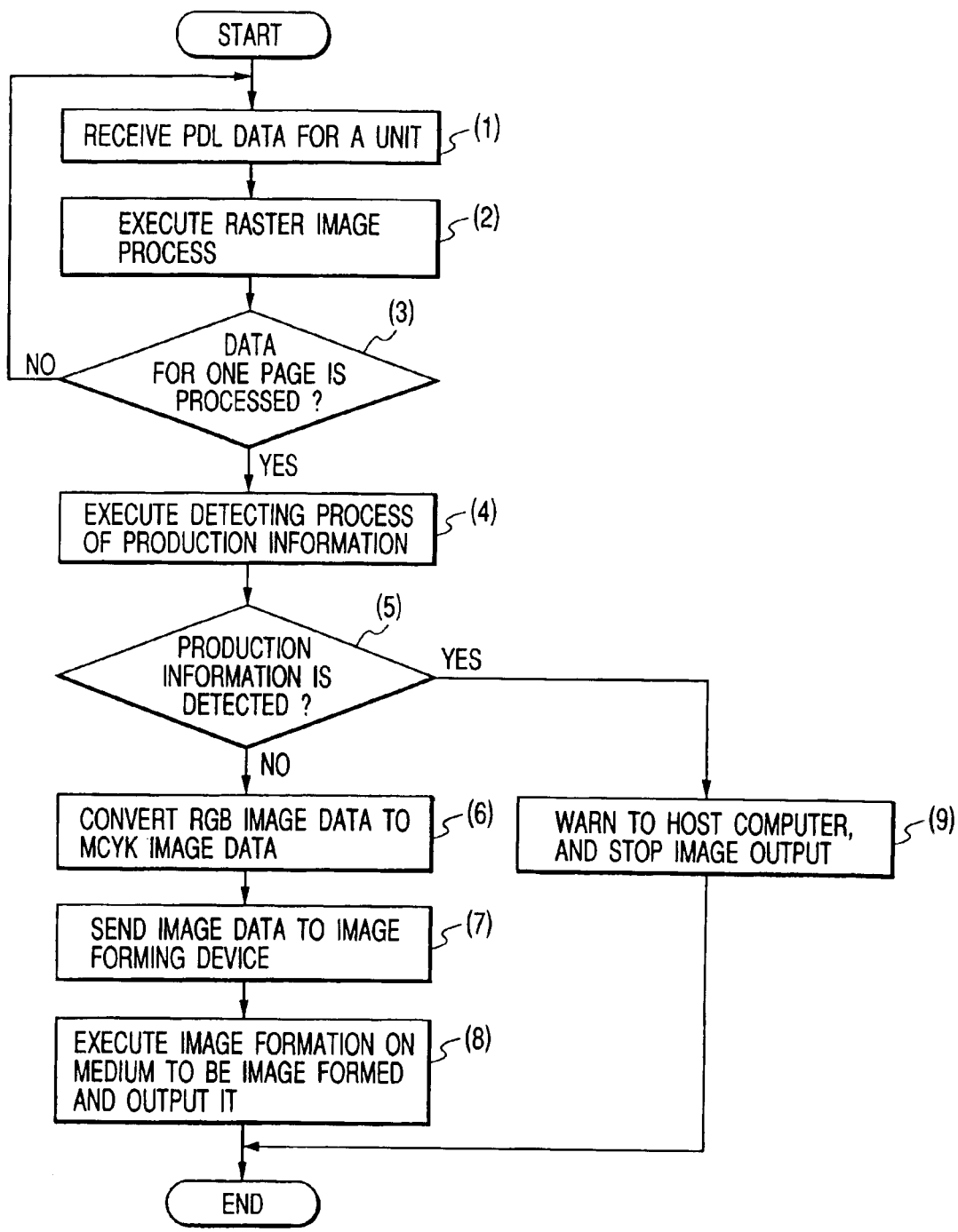
FIG. 6 is a flowchart illustrating one example of a first image data processing procedure.

FIG. 6 is a flowchart illustrating one example of the first image-data processing procedure in an image processing system according to this embodiment, which corresponds to the PDL data processing at the print controller 102. Numerals 1 to 9 indicate the step numbers.

First, the system receives one unit of PDL data from the host computer 101 (step 1). This one unit may be a few byte, one page, or one line as far as it fits to the processing. Then, the system executes raster image processing (expansion) on thus received PDL data and then writes it into the memory 106 (step 2). Next, the system checks whether data processing (reception and expansion) of one page of the PDL data has been completed (step 3) and, if it decides it is not completed yet, returns to step 1.

If, on the other hand, it decides it is completed, the system detects production information, i.e. detects whether the production information is contained in the image data which has undergone raster image processing (step 4).

This detection processing for production information, as described later, recognizes the production information by detecting the data of a mark, if any, attached to the image of the production which indicates its copyright.

Next, the system checks the results of detecting the production information given at step (4) (step 5) and, if it decides that the production information has been detected, it does not send the image data to the image forming device 103 but warns by display to the host computer 101 or the operating unit 250 to the effect that it cannot output the image data specified for printout because the it is production (see later-described FIG. 8A) and stops image output (step 9) to finish the processing. In this case, the image data is not sent to the image forming device 103 but the processing is all finished in the print controller 102.

At step 5, on the other hand, if it is decided that at step 4 no production information has been detected in the image data at the time of production-information detection processing, the system, along an ordinary flow of image processing, reads out the RGB raster image data stored in the memory 106 and executes logarithmic conversion to convert the RGB image data into MCYK image data (step 6).

Next, the system sends thus converted MCYK image data to the image forming device 103 (step 7), to finish image processing of one page of data for the print controller 102.

Next, the system, according to the above-mentioned image forming procedure, forms an image on a recording medium based on the image data sent from the print controller 102 and outputs thus formed image (step 8), to finish a series of image forming processes.

The above processing prevents digital-information version of production from being copied illegally.

The following will describe detection processing for production information.

FIGS. 7A to 7E show one example of a mark and a character string which indicate that the image data is production.

FIGS. 7A to 7C show one example of a mark which indicates that the image data is production; FIG. 7D shows one example of a bar code which indicates that it is production; and FIG. 7E shows one example of a character string which indicates that it is production, so that an image having any one of these shown by FIGS. 7A to 7E is accepted as production.

[Detection Processing for Production Information]

In it premised here that an image with copyright has any certifying means indicative of production so that image data with copyright which has undergone rester image processing may be detected.

For example, as shown in FIGS. 7A to 7D, a mark or bar code indicative of production is determined and registered beforehand.

In this case, image data such as these production mark or bar code may be stored beforehand in the memory 106 of the print controller 102, so that the detecting circuit 105 would execute pattern matching between this data and the above-mentioned raster-information processed data, thus detecting the concerned mark.

Alternatively, in place of using such a symbol as a mark or bar code, as shown in FIG. 7E, by providing production with a character string which indicates "production copy unauthorized" for example "This image is production so cannot be copied" beforehand, the detecting circuit 105 may execute block selection on one page of the above-mentioned raster-image processed image data, to subsequently extract the character string data and recognize the concerned character string using a character recognizing means, thus detecting that the image data is production to detect the concerned character string. In this case also, a sample of a character string to be detected is stored beforehand in the memory 106 in the print controller 102.

Further alternatively, in place of such character string as shown in FIG. 7E, an ID number indicative of an image with copyright is predetermined so that the detecting circuit 105 may extracts character string data with that ID number to recognize the concerned character string using a character recognizing means, thus detecting that the image is production. In this case also, the ID number to be detected is stored beforehand in the memory 106 in the print controller 102.

Also, there are some cases where, as mentioned above, it is desired to avoid adding an extra visible image such as a mark or character to an image with copyright. In such a case, such a technique may be considered that production information may be masked by embedding some add-on information of a certain predetermined pattern of a few dots expressed for example in a yellow color almost invisible to the human eyes into an image with copyright. In this case also, such a method may be considered that this add-on information is stored beforehand in the memory 106 so that the concerned image is detected to be production by detecting the color and the add-on pattern.

Still further alternatively, to mask production information, for image data of each picture element, a few high-order bits starting from the LSB (least significant bit) may be used as a recognizing means. In this case, the production information can be subdivided for each picture element, thus making it possible to recognize image data of interest in such a way that its only one portion is an image with copyright and the remaining does not have copyright. Therefore, as mentioned above, only the portion of image without copyright of one page of image data can be output, thus preventing such portions as decided to have copyright from being output.

Also, by forming a pattern by using this few bit data for each picture element as a total one page to recognize image with copyright, a production-copy-prohibiting mark etc. can be masked as something like a watermark into each one page of image data. In this case, such a method may be considered that production-recognizing bits for each picture element may be extracted to constitute one page of image data and then execute pattern matching on such production marks as shown in FIG. 7A to 7D, thus detecting that the data is production.

Note here that the method for detecting image data of production is not limited to the above-mentioned example but may be any as far as it can detect that the data of interest is production.

Figure 8A:
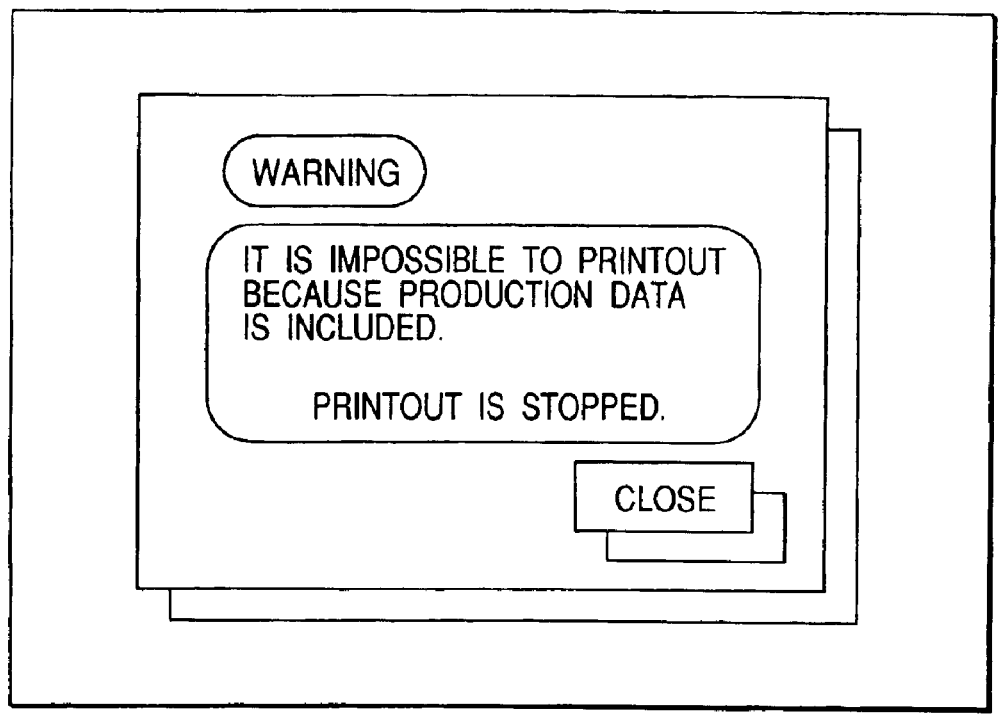
FIGS. 8A and 8B show examples of a warning screen displayed at a display portion of an operating unit of a host computer or an image processing device.
Figure 8B:
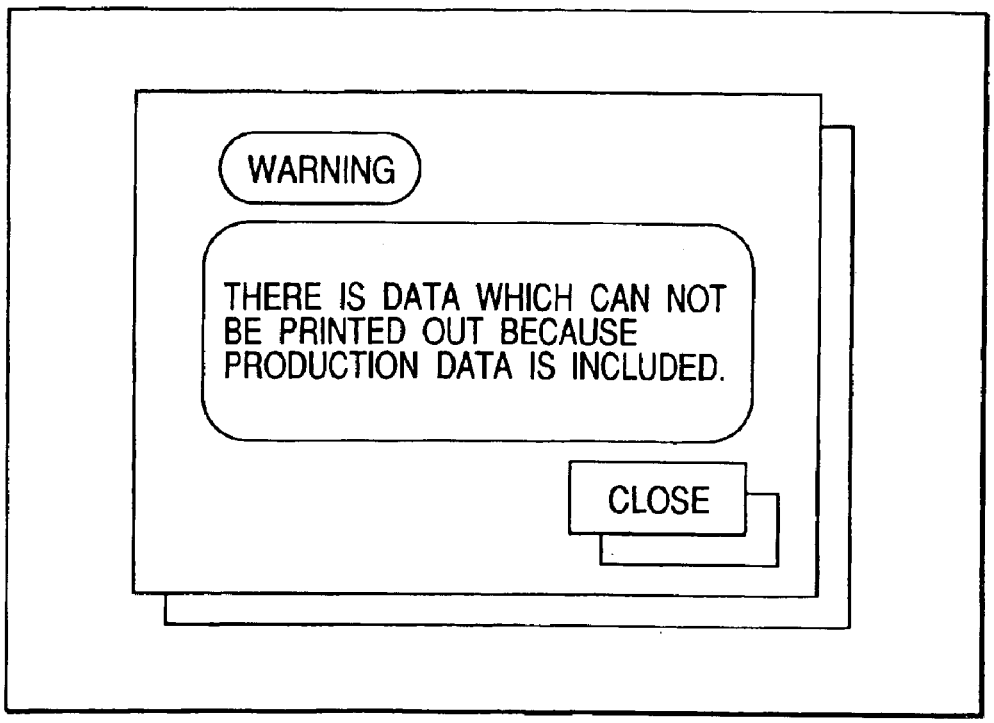

FIGS. 8A and 8B show one example of a warning screen displayed on the display unit of the host computer 101 or the display unit of the operating unit 250 of the image processing device 103.

In FIG. 8A corresponds to warning display to the effect that image data specified to be printed out cannot be output (i.e., printed out) because it is production, while FIG. 8B corresponds to warning display that image date specified to be printed out could not be output (i.e., printed out) because it is production.

Second Embodiment

Although the above first embodiment has been described in such a case of performing prohibition and suspension of image output all at the print controller 102, such a configuration may be given that the print controller 102 itself may decide whether image data should be prohibited from being output and send the information to the image forming device 103, thus causing it to stop image output. The following will describe this embodiment.

Processing of PDL data at the print controller 102 and the image forming device 103 is described with reference to a flowchart shown in FIG. 9.

Figure 9:
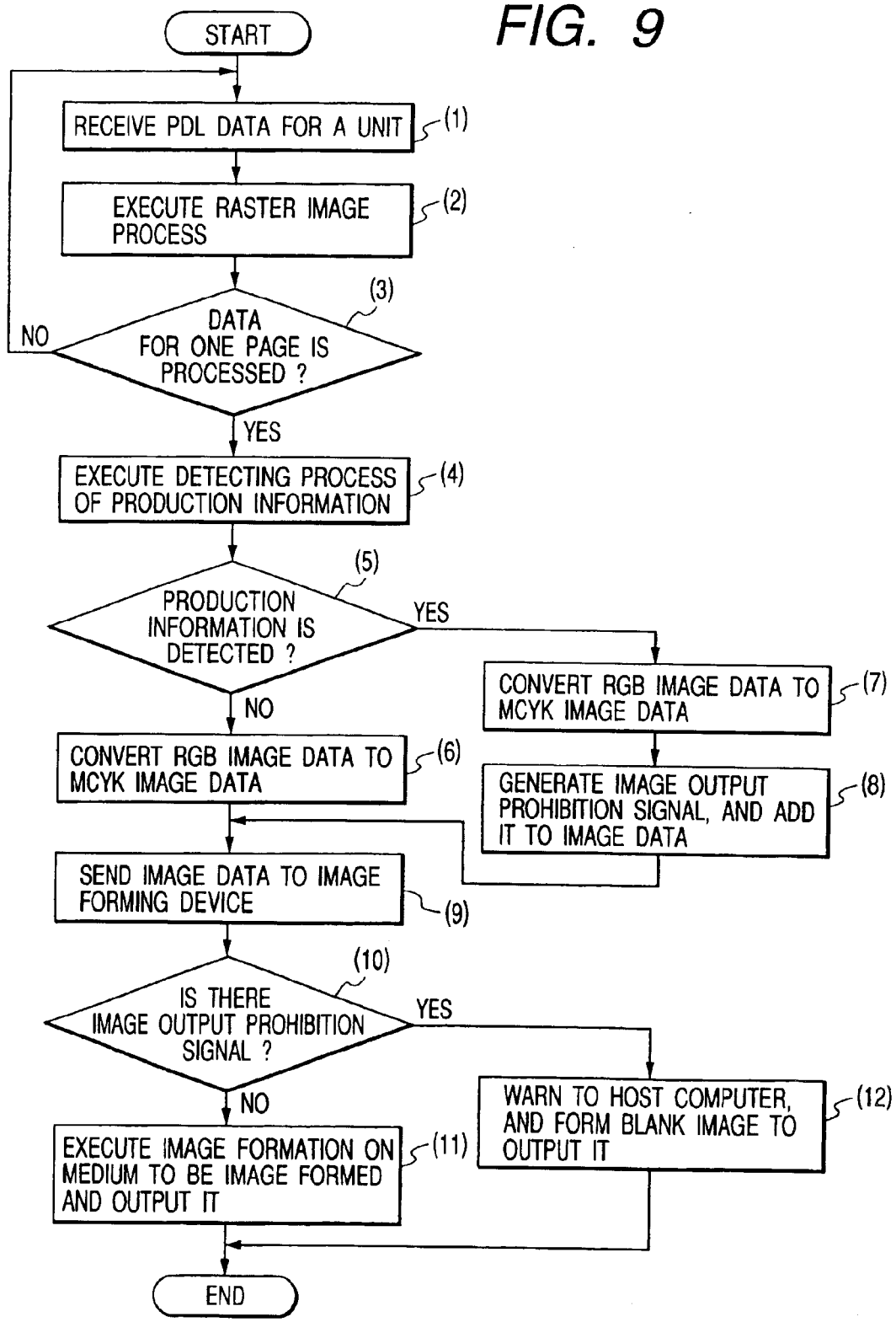
FIG. 9 is a flowchart illustrating one example of a second image data processing procedure.

FIG. 9 shows one example of a second image-data processing procedure, corresponding to the PDL data processing executed at the print controller 102 and the image forming device 103. Note here that numerals 1 to 12 indicate relevant step numbers.

Description of steps 1 to 5 for receiving PDL data from the host computer 101 and detecting production information in image data which has undergone raster image processing is omitted here because they are the same as those of a procedure indicated by steps 1 to 5 of the above-mentioned flowchart shown in FIG. 6.

At step 5, the system checks the results of detecting the production information given at step (4) and, if it has decided that it has detected production information, it reads out RGB raster image data stored in the memory 106 and then performs logarithmic conversion to convert it into MCYK image data (step 7), in order to create an image-output prohibition signal and add it to the above-mentioned MCYK image data, causing control to go to step 9.

If, on the other hand, it decides that no production information has been detected in image data by the detection processing of the production information given at step 4, the system similarly reads out RGB raster data stored in the memory 106 and then performs logarithmic conversion to convert the RGB image data into MCYK image data (step 6), causing control to go to step (9).

Next, at step (9), the system sends the MCYK image data to the image forming device 103.

Next, the image forming device 103 checks whether the image data sent from the printer controller 102 is provided with the image-output prohibition signal (step 10) and, if it decides that the image-output prohibition signal has been added, it forms an image on a recording medium and outputs it (step 11), thus finishing a series of image forming processes.

If it decides that the image-output prohibition signal has been added to the image data sent from the printer controller 102, the system gives the host computer 101 or the operating unit 250 warning display to the effect that image data specified to be printed out cannot be output because it is production (see later-described FIG. 8A) and also, to prohibit the image data being output, converts the image data all into a blank image and outputs it (step 12), thus finishing its processing.

The above processing is able to prohibit digitized production from being copied illegally.

Third Embodiment

This embodiment is described in a case of one example of data processing for embedding production information into image data to mask it, particularly in a case of detecting an inconspicuous or invisible digital watermark indicative of production in order to detect production information. This embodiment is specifically described in such a case that a digital watermark indicative of production constitutes a production mark as image data for the entire one page.

Figure 10:
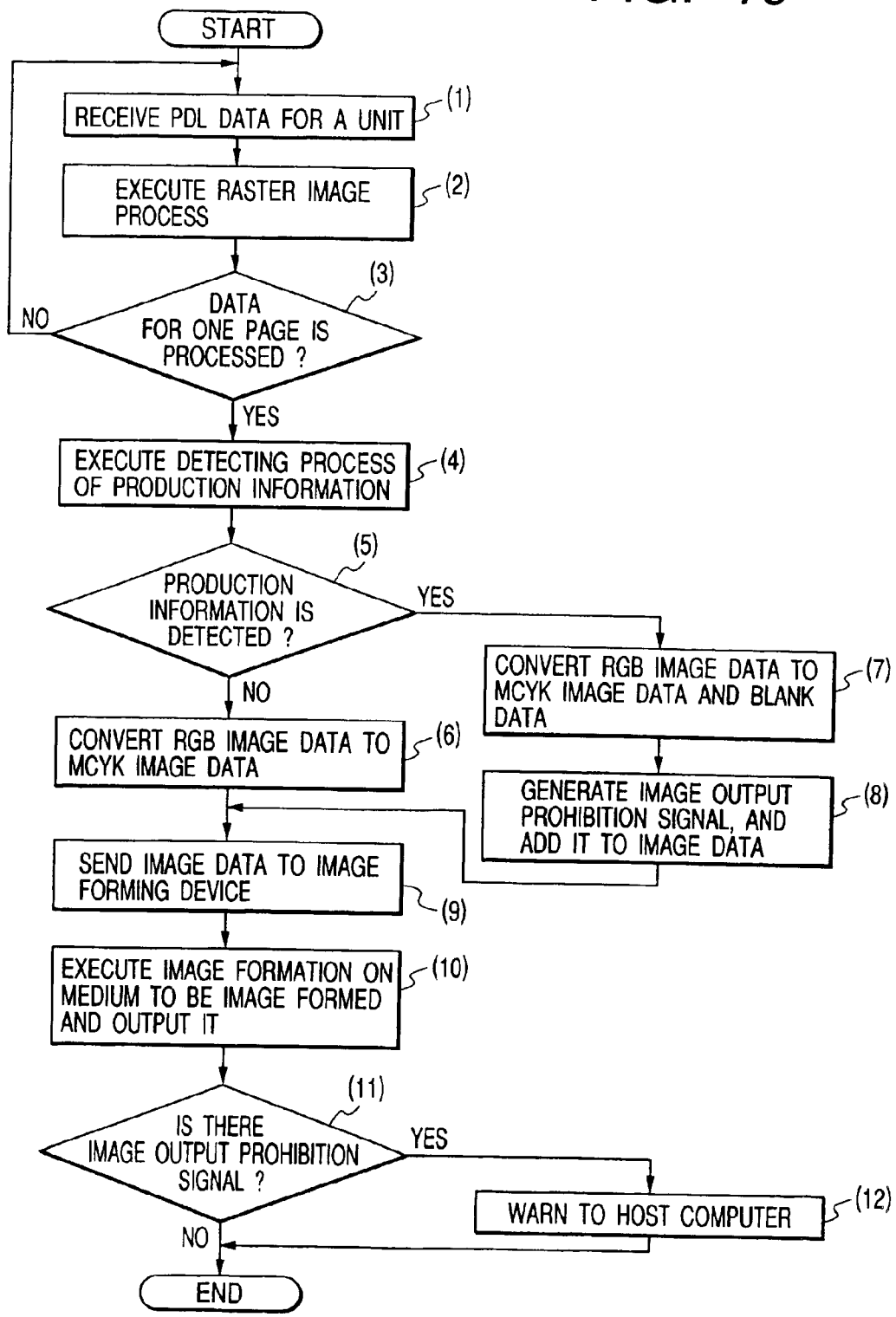
FIG. 10 is a flowchart illustrating one example of a third image data processing procedure.

The following will describe operations, with reference to a flowchart shown in FIG. 10, of processing PDL data at the print controller 102 and the image forming device 103.

FIG. 10 is a flowchart illustrating one example of a third image-data processing procedure, corresponding to the PDL data processing at the print controller 102 and the image forming device 103. Note there that numerals 1 to 12 indicate the step numbers.

Description of steps 1 to 3 for receiving PDL data from the host computer 101 for raster image expansion is omitted here because they are the same as the above-mentioned processing procedure of steps 1 to 3 of the flowchart shown in FIG. 6.

At step 4, the system checks, as follows, image data which has been raster image processing to detect production information therein. First, the system extracts the low-order three bits starting from the LSB for each picture element to create a digital-watermark signal which is a property signal. The system uses this digital-watermark signal as one page of data to create digital-watermark information and image data, so that it may perform pattern matching to search this watermark information for a mark such as for example those shown in FIGS. 7A to 7C, thus detecting the production information.

Next, the system checks the results of detecting the production information given at step 4 (step 5) ad, if it decides that the production information has been detected, it reads out RGB raster image data stored in the memory 106 and then performs logarithmic conversion to convert the RGB image data into MCYK image data and also converts the image data, to prohibit its output, into a blank image (step 7) to create an image-output prohibition signal and add it to the image data (step 8), thus causing control to go to step 9.

If, on the other hand, it decides that the production information has not been detected in the image data by the detecting processing for the production information at step 5, the system reads out RGB raster image data stored in the memory 106 and then performs logarithmic conversion to convert the RGB image data into MCYK image data (step 6), thus causing control to go to step 9.

At step 9, the system sends thus converted MCYK image data to the image forming device 103, which then forms an image on a recording medium and outputs it (step 10).

Next, the image forming device 103 checks whether the image-output prohibition signal is added to the image data sent from the print controller 102 (step 11) and, if it decides that the output prohibition signal has not been added to the image data, it finishes a series of image forming processes.

If, on the other hand, it decides that the image-output prohibition signal has been added to the image data, it sends, to the host computer 101 or the operating unit 250, warning display (see FIG. 8B) to the effect that the image data specified to be printed out cannot be output because it is production, thus finishing a series of image forming processes.

Although the flowchart shown in FIG. 10 has been described in a case of converting image data into a blank image in the print controller 102, such a configuration may be employed that if the image-output prohibition signal is detected in the image processing device 103; the image data may be converted, in order not to be output, into a blank image and output as formed.

The above processing makes it possible to use a production mark in which a digital watermark is constituted as image data of the entire one page, to detect a production image whose production information is embedded into the image data to mask it so as to prohibit the outputting of the one page of image data of the production, thus preventing digitized production images from being copied illegally without adding an extra visible image such as a mark or character to the production image.

Fourth Embodiment

Although the above third embodiment has been described in a case where a digital watermark indicative of production constitutes a production mark as an entire one page of image data, such a configuration may be employed that the digital watermark indicative of production corresponds to each picture element. The following will describe this embodiment.

Figure 11:
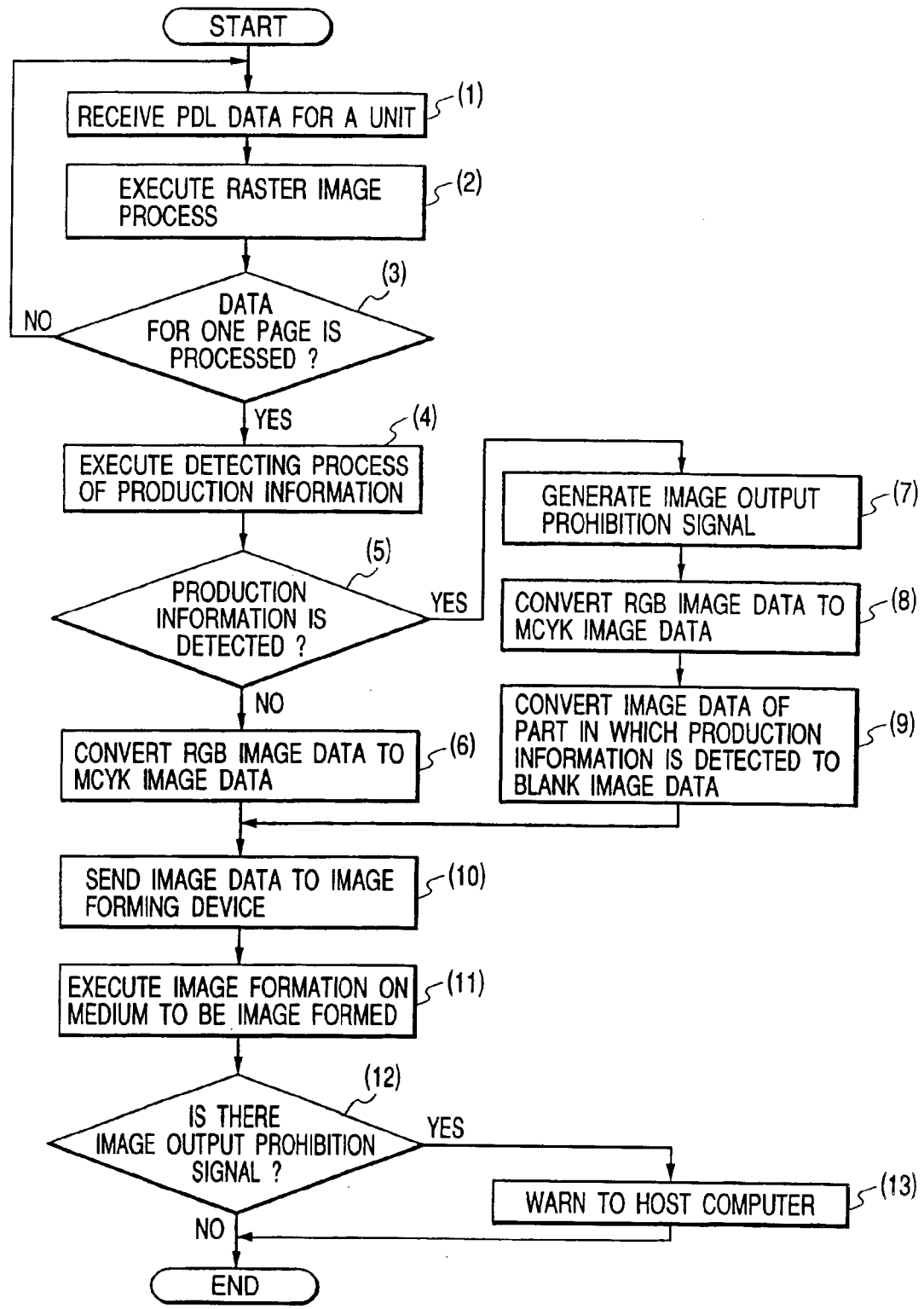
FIG. 11 is a flowchart illustrating one example of a fourth image data processing procedure.

The following will specifically describe operations of PDL data processing at the print controller 102 and the image forming device 103 with reference to a flowchart shown in FIG. 11.

FIG. 11 is a flowchart illustrating one example of a fourth image-data processing procedure, corresponding to the PSL data processing at the print controller 102 and the image forming device 103. Note here that numerals 1 to 13 indicate the step numbers.

Description of steps 1 to 3 for receiving PDL data from the host computer for raster image expansion is omitted here because they are the same as the above-mentioned steps 1 to 3 for processing procedure of the flowchart shown in FIG. 6.

At step 4, the system detects checks, as follows, image data which has undergone raster image processing to detect production information therein. First, the system extracts the low-order three bits starting from the LSB of each picture element to create a digital watermark signal, which is a property signal for each picture element, and image data. Using this digital watermark signal, the system performs pattern matching on predetermined production data, thus detecting production information about each picture element.

Next, the system checks the results of detecting the production information given at step 4 (step 5) and, if it decides that the production information has been detected for any picture element in the image data, it creates an image-output prohibition signal indicative of image-output-prohibited data (step 7) and reads out RGB raster image data stored in the memory 106 and then performs logarithmic conversion to convert the RGB image data into MCYK image data (step 8) and then converts only such image data as detected to be production into a blank image to prohibit outputting of such portions of image data (picture elements) to be detected to be production (step 9), thus causing control to go to step 10.

If, on the other hand, it decides at step 5 that the production information has been detected in none of the picture elements in the image data as a result of detecting the production information given at step 4, the system reads out RGB raster image data stored in the memory 106 and then performs logarithmic conversion to convert the RGB data into MCYK image data (step 6), thus causing control to go to step 10.

At step 10, the system sends thus converted MCYK image data to the image forming device 103, which then forms an image on a recording medium and outputs it (step 11).

Next, the image forming device 103 checks whether the image-output prohibition signal is added to the image data sent from the print controller 102 (step 12) and, if it decides that the image-output prohibition signal has not been added, it finishes a series of image forming processes.

If, on the other hand, it decides that the image-output prohibition signal has been added, the system sends warning display (see FIG. 8B) to the effect that the image data specified to be printed out cannot be output because it is production, to the host computer 101 or the operating unit 250 (step 13), thus finishing a series of image forming processes.

Although the flowchart shown in FIG. 11 has been described in a case of converting image data into a blank image for each picture element in the print controller 102, such a configuration may be employed that if the image-output prohibition signal for each picture element is detected in the image processing device 103, the concerned picture element would be converted, to prohibit the outputting of its corresponding image data, into a blank image to form an image and output it.

The above processing makes it possible to detect production information (digital watermark) which is embedded corresponding to each picture element so as to prohibit the outputting only of such image data of picture elements corresponding to the production image, thus outputting the information of portions other than the production image without adding an extra visible image such as a mark or character to the production image, to prevent digitized production from being copied illegally.

Although this embodiment has been described about a means of converting an output signal into a blank image as a means of prohibiting the outputting of an image, such a configuration may be employed as using a method for scrambling for example any solid-back pattern image or data other than an original image or changing its magnification before outputting it or printing a message such as "production copy unauthorized".

Fifth Embodiment

Although the above-mentioned embodiments have taken a measure to prevent a normal printout when production information was detected, the following embodiment uses such a configuration that full-color data, production information (i.e., image-output prohibition signal), and a password (which is detailed later) are embedded into PDL data received at the print controller 102 so that the image-output prohibition signal and the password may be written into the memory 106 at the detecting circuit 105.

Figure 12:
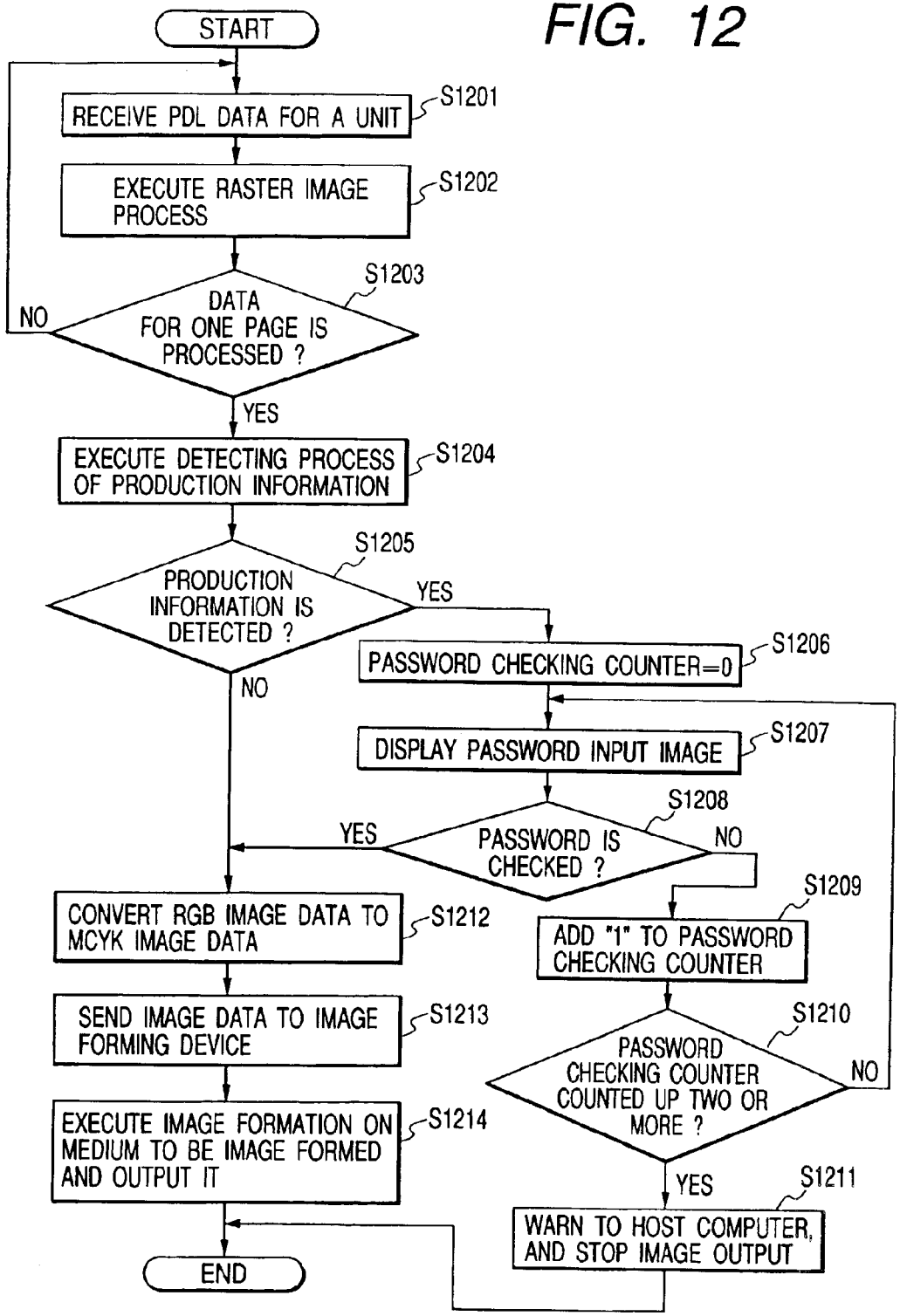
FIG. 12 is a flowchart illustrating image data processing at a printer controller according to a fifth embodiment.

FIG. 12 is a flowchart illustrating the expansion processing of the PDL data by the print controller shown in FIG. 1.

Step S1201:

The system receives PDL data in for each prescribed unit from the host computer 101. The PDL data is received in one or multiple of such a unit as fitting to processing, e.g., units of a few bytes, one page, or one line.

Step S1202:

The system analyzes thus received PDL data and performs raster image processing to convert it into raster image data (i.e., RGB raster image data) and then writes it into the memory 106.

Step S1203:

The system receives each page of the PDL data to decide whether it has undergone expansion processing.

If, as the results of this decision, it is found that the expansion processing has not been completed for that one page of the PDL data, control returns to step S1201 to permits the system to repeat steps S1201 to S1203 again on the PDL data received in prescribed units. When that one page of the PDL data has completely been expanded, control goes to step S1204.

Step S1204:

The system checks the RGB raster image data (hereinafter called "image data" simply) obtained by the raster image processing executed at step S1202 to detect whether that data contains production information. This detection processing of production information, which is detailed later, refers to such processing that detects a mark (i.e., production information) indicative of copyright from image data subject to processing. In this case, a password, which is embedded together with the production information, of the concerned image is also detected.

Step S1205:

Based on the results of the detection executed at step S1204, the system checks whether the production information has been detected from the mage data, that is, decides whether the production information has been added to the image data subject to processing to indicate that the concerned image data is production.

If the results of this check indicate that the image data is production, control goes to the processing starting from step S1206 and, if not, goes to the processing starting from step S1212.

Step S1206:

If the image data subject to processing is production, it is copy-protected to prohibit the outputting the image.

Therefore, here first, to check a password given to release the above-mentioned copy-protection, the password-check counter is returned to "0".

Figure 13A:
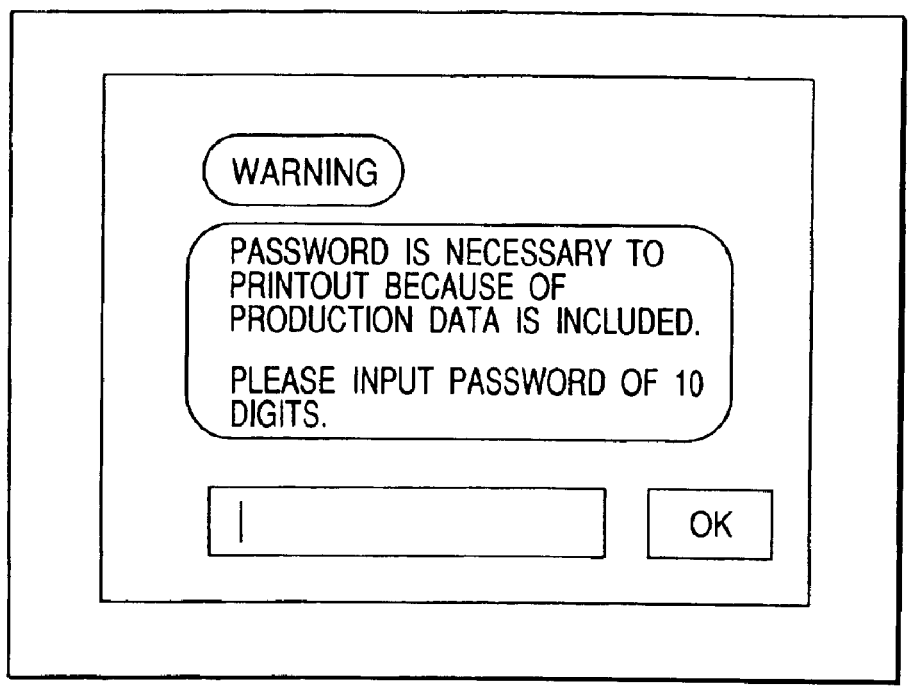
FIGS. 13A and 13B respectively show examples of a password input screen and a password-mismatch warning screen which are displayed on the host computer in image data processing.

Step S1207:

The system causes the host computer 101 to display such a password-entry screen as shown in FIG. 13A, to ask the user to enter the password.

Step S1208:

The system compares the user's password entered on the password-entry screen displayed at step S1207 to a password detected by the detection processing executed at step S1204, to decides these two passwords agree with each other.

If it is decided that they do not agree, control goes to the processing starting from step S1209 and, if they agree, control goes to the processing starting from step S412.

Step S1209:

If the user's password did not agree with the image data's password, the system adds "1" to the password-check counter which has been cleared at step S1206.

Step S1210:

The system decides whether, as a result of processing executed at step S1209, the password-check counter indicates a value of "2" or higher. This decision is made to permit the user to enter his password again if he has mistook in entry of the password.

If it is decided that the counter value is less than "2", control returns to step S1207, to permit the user to enter his password again. If, on the other hand, the value is "2" or higher, that is, if the user has mistook the entry of his password twice, control goes to step S1211.

Figure 13B:
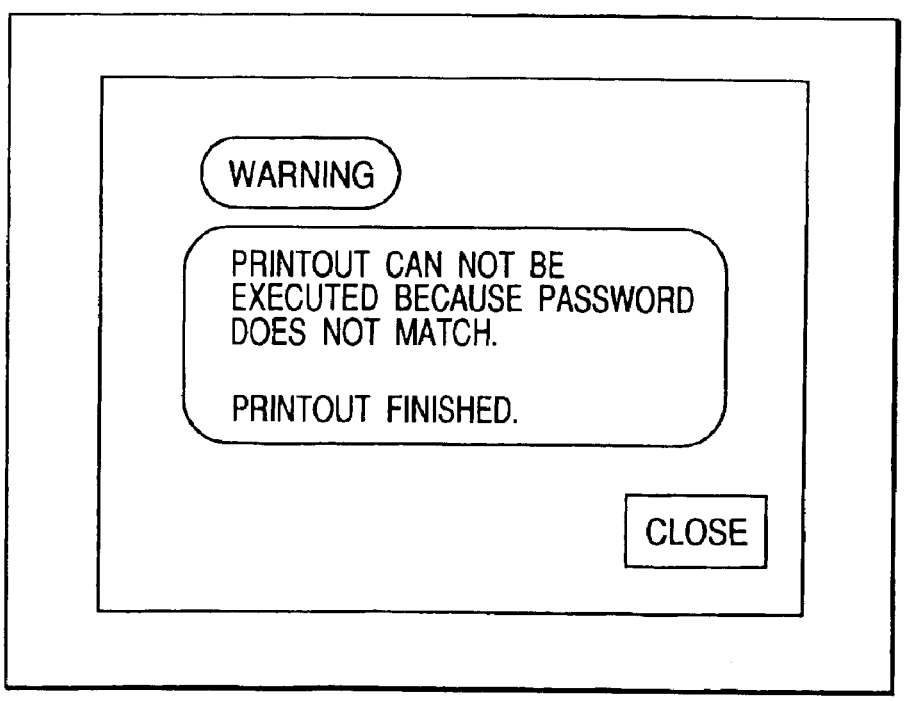

Step S1211:

If the user has mistook the entry of the password twice, the system does not send image data subject to processing to the printer 103. With this, the concerned data is prevent from being output. Instead, the system causes the host computer 101 to display warning such as shown in FIG. 13B to the effect that specified image data cannot be output because disagreement between these two passwords. Then the system finishes the processing.

Thus, in this case, the image data is not sent to the printer 103, to finish the processing all in the print controller 102.

Step S1212:

If the results of decision at step S405 indicate that the image data subject to processing is not production or those at step S408 indicate that the password of the image data which is production has agreed with the user's password, the system, along an ordinary image processing flow, reads out image data (i.e., RGB raster image data) stored in the memory 106 and then performs logarithmic conversion to convert that data into MCYK image data.

Step S1213:

The system sends the MCYK image data obtained at step S1212 to the printer 103. With this, image processing of one page of image data is finished.

Step S1214:

The printer 103 forms an image based on the image data sent from step S1213 on a recording medium according to the above-mentioned image forming procedure and outputs it.

If there is provided a plurality of pages of image data, the system executes processing starting from step S1201 again.

The above-mentioned detecting processing of production information executed at step S1204 is specifically described as follows.

It is premised here that the production image data has some certifying means (i.e., production information) indicative of production so that it can be decided whether raster-image processed image data is production image data (i.e., image data with copyright).

(Certifying means 1)

For example, as shown in FIGS. 14A to 14D, a mark or a bar code indicative of production is determined and registered beforehand and the embedded into production image data.

In this case, the above-mentioned mark or bar code already registered is stored in the memory 106 in the print controller 102 beforehand. With this, the system performs pattern matching between this stored data and the above-mentioned raster-image processed data to detect the concerned mark, thus deciding whether the image data subject to processing is production.

As for a password for image data of production, on the other hand, in place of a mark and bar code, for example the above-mentioned ID number of the concerned image data (production image) determined beforehand such as shown in FIG. 14E is embedded.

In this case, the system extracts as character-string data the ID number from image data subject to processing in which that ID number is embedded, to recognize the concerned character string by using a character-recognizing means, so as to confirm a password corresponding to that number (because this password corresponding to the ID number is a sort of data piece encrypted by an crypto-analyzing circuit included ion the detecting circuit 105), thus recognizing the password.

Note here that only the password data may be used as bar-code data such as shown in FIG. 14D.

(Certifying means 2)

If, as mentioned above, in order to avoid adding an extra visible image such as a mark or character to production image data, the production information is masked by for example embedding beforehand a few dots of predetermined pattern of add-on information (expressed in yellow hard to see with the human eyes) into the concerned image data.

In this case also, the above-mentioned add-on information is stored in the memory 106 beforehand, to detect the color and the add-on pattern, thus detecting the production and its password.

(Certifying means 3)

A few high-order bits starting from the LSB of each picture element of image data are used as a certifying means in order to mask the production information (digital watermark).

In this case, since the production information can be subdivided for each picture element, it is possible to recognize only a portion of certain image data as a production image and the remaining as a non-production image. Therefore, as mentioned later, it is also possible to output only the portion of an non-production image of one page of image data and not to output those portions that have been decided to be production image data.

(Certifying means 4)

By forming a pattern using the above-mentioned few bits of data for each picture elements as the entire one page for recognition of production images, a production prohibition mark etc. is embedded as a watermark into one page of image data to mask each image data.

In this case, the system extracts the production the recognizing bit data of each picture element to constitute one page of image data and then perform pattern matching between such a mark and a bar code as shown in FIGS. 14A to 14D, thus detecting that it is production.

Note here that the method for detecting production information or a password from image data subject to processing is not limited to the above-mentioned methods described in Certifying means 1–4, so that any method may be used as far as it can detect that concerned image data is production or it can detect, a password.

Sixth Embodiment

Figure 15:
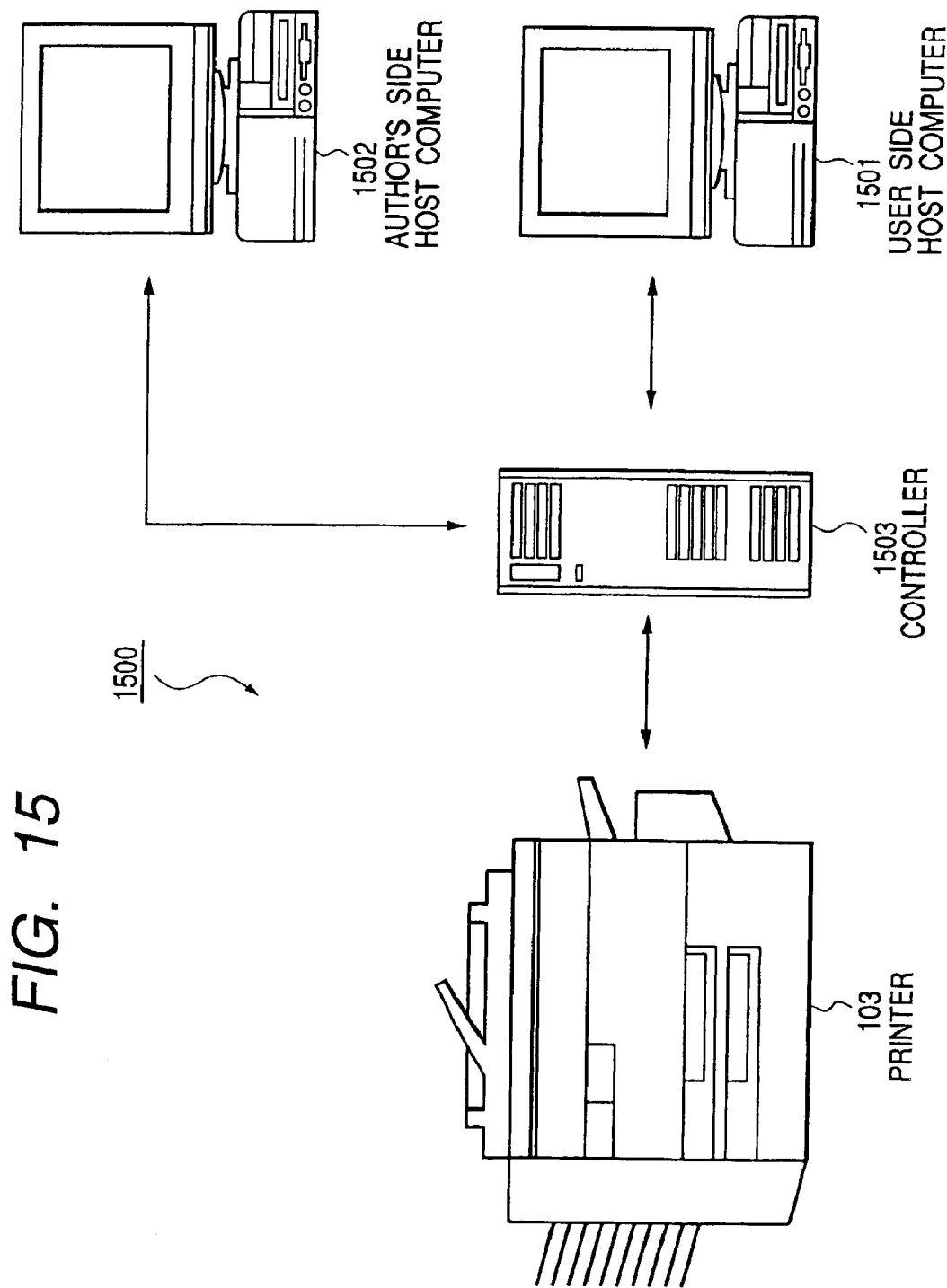
FIG. 15 shows an configuration of an image forming system according to a sixth embodiment.

This embodiment is applied for example in an image forming system 1500 such as shown in FIG. 15.

This image forming system 500 has a configuration similar to that of the above-mentioned image forming system 100 shown in FIG. 1, except that when an image is prohibited from being output because its production information is detected, this system 500 accesses the author's side host computer 1502 connected to the print controller 1503 over a network, to release that state of image-output prohibition.

Detailed description of the above-mentioned image forming system 1500 shown in FIG. 15 is omitted here because its components operating in a manner similar to those of the above-mentioned image forming system shown in FIG. 1 are indicated by the same reference numerals.

In the image forming system 1500, the above-mentioned author's side host computer (hereinafter called "first host computer") 1502 is connected to the print controller 1503 over a network.

The print controller 1503 transfers the information which identifies production's image data and its password with the first host computer 1502 and also transfers output permission for image data to be output from the printer 103 or production's image data with a general user's host computer (hereinafter called "second host computer").

The host computer 1502, like the above-mentioned host computer 101 shown in FIG. 1, converts image data into information coded in a page description language (PDL here) and sends it to the print controller 1503 via a connecting cable.

Therefore, the print controller 1503 analyzes PDL data sent from the second host computer and converts it into raster image data and then sends it to the printer 103 via the connecting cable. During this processing, if production information is detected from among that raster image data by the detection processing, the system first obtains acceptance for printout permission from the concerned author's side the first host computer over the network and then sends the image data to the printer 103.

Figure 16:
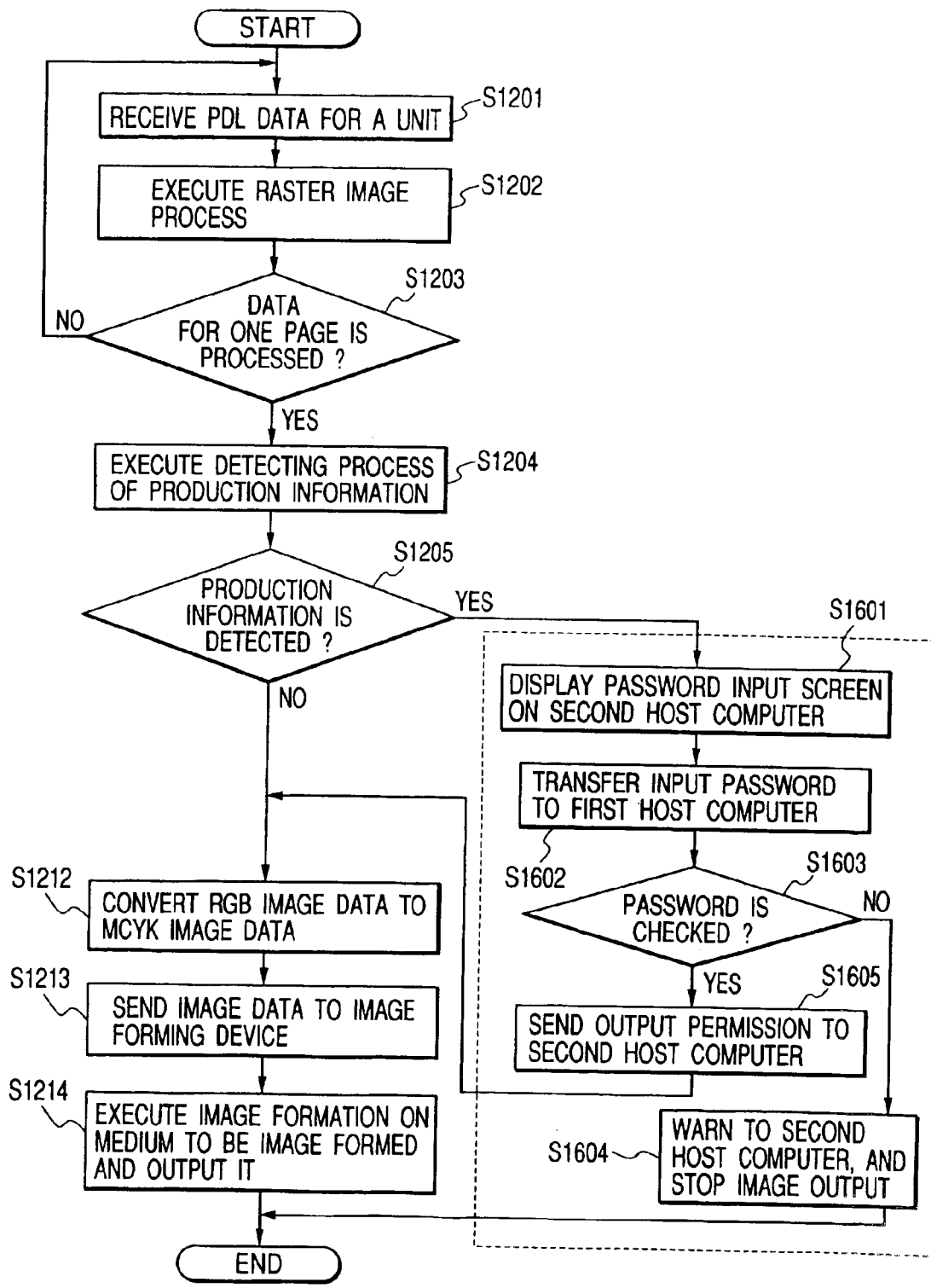
FIG. 16 is a flowchart illustrating image data processing at a printer controller in the image forming system shown in FIG. 6.

FIG. 16 is a flowchart illustrating the expansion processing for PDL data executed at the print controller 1503.

Detailed description of the above-mentioned flowchart shown in FIG. 16 is omitted here because its like steps are indicated by the same step numbers as those for the flowchart shown in FIG. 12.

Steps S1201–1205:

The system receives PDL data from the second host computer 1501 and then converts it into raster image data, to detect production information and the password based on that image data.

If the results of this detection processing indicate that the concerned image data is production, control goes to processing starting from step S1601. This processing differs from that in the above-mentioned fifth embodiment.

Step S1601:

If the concerned image data is production, to check the password in order to release a copy-protection state, the system causes the second host computer 1501 to display a password-entry screen (see the above-mentioned FIG. 13A), to ask the user to enter the password.

Step S1602:

The system sends to the author's side first host computer over the network the user's password entered on the password-entry screen at step S1601 together with the ID number for identifying the corresponding mage data.

Step S1603:

Checking of the password for the ID number of the image data sent at step S1602 is executed in the first host computer.

Step S1604:

If as a result of check executed at the first host computer 1502 at step S1603, the password cannot be identified, to prohibit the outputting of the concerned image data, the system does not send that image data to the printer 103 but does it causes the second host computer 1501 to display warning to the effect that the specified image data cannot be output because of disagreement of the password (see the above-mentioned FIG. 13B). Then, this processing is finished.

Step S1605:

If, as a result of check executed by the first host computer at step 1603, the password is identified, the system issues output permission to the second host computer.

Then, the above-mentioned steps S1212 to S1214 are executed, to output the concerned image data from the printer 103.

Seventh Embodiment

The above-mentioned sixth embodiment employs such a configuration that to release an output-prohibited state for image data provided when production information was detected from among the image data, the system accesses the author's side first host computer connected with the printer controller 1503 over the network to release the image-output-prohibited state.

In this seventh embodiment, however, instead of prohibiting the outputting of image data, the system gives (the user of) the second host computer 1501 the warning to the effect that the concerned data is production and then prompts the author's side first host computer 1502 for accepting accounting and then posts the concerned output information to the author's side first host computer 1502 according to the number of printout sheets given by the second host computer 1501 (user) a the printer 103, for automatic accounting.

Figure 17:
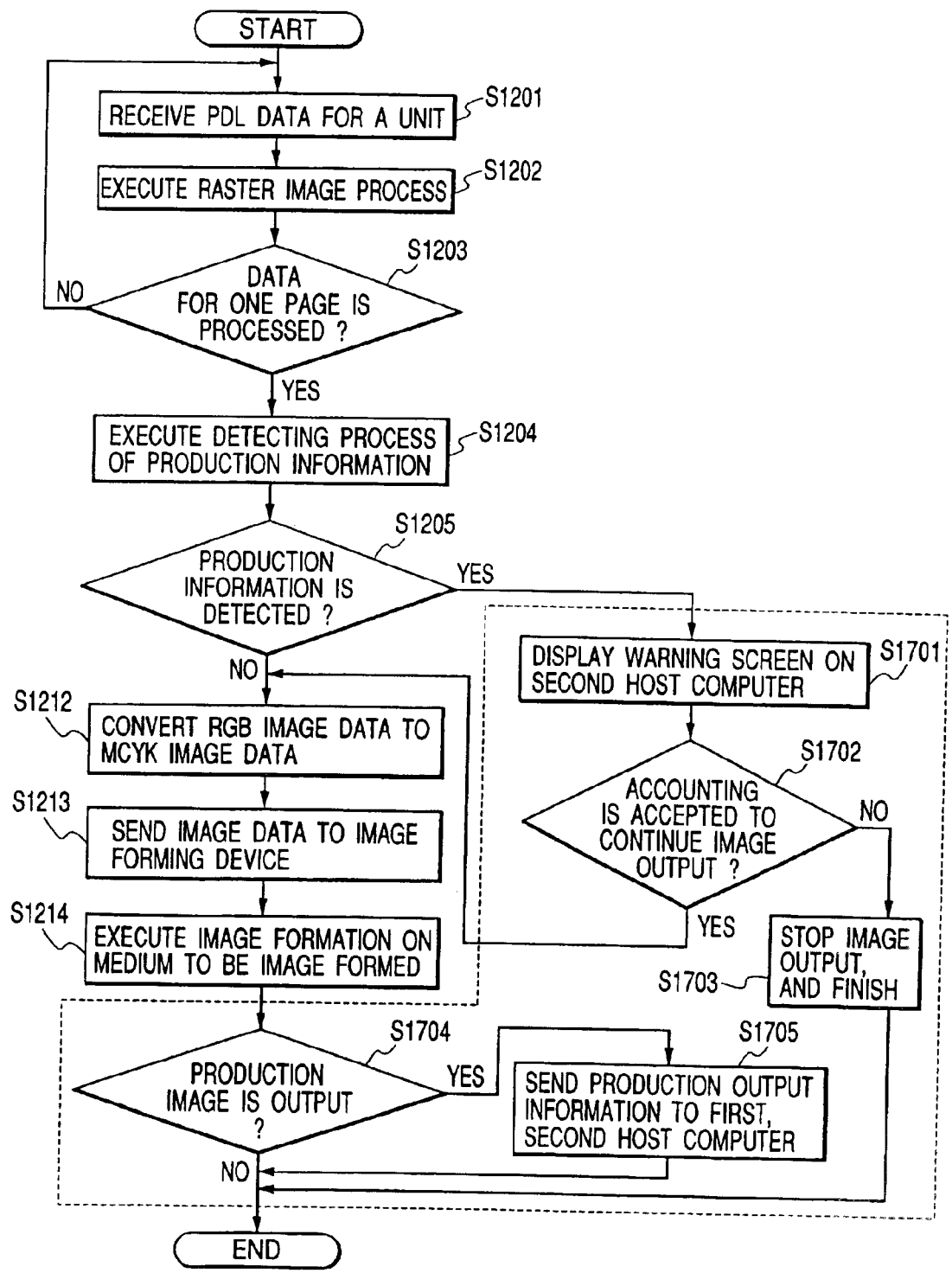
FIG. 17 is a flowchart illustrating image data processing at the printer controller in a seventh embodiment.

For this purpose, expansion of PDL data executed at the print controller 1503 comes in for example such processing as shown in FIG. 17.

Detailed description of the flowchart shown in FIG. 17 is omitted here because its like steps are indicated by the same numbers as those for the flowchart shown in FIGS. 12 and 16.

Steps S1201–S1205:

The system receives PDL data from the second host computer and then converts it into raster image data, to detect the production information and password from among the image data.

If the results of this detection processing indicate that the concerned image data is production, control goes to processing starting from step S1701. This processing differs from that of the above-mentioned fifth and sixth embodiments.

Figure 18:
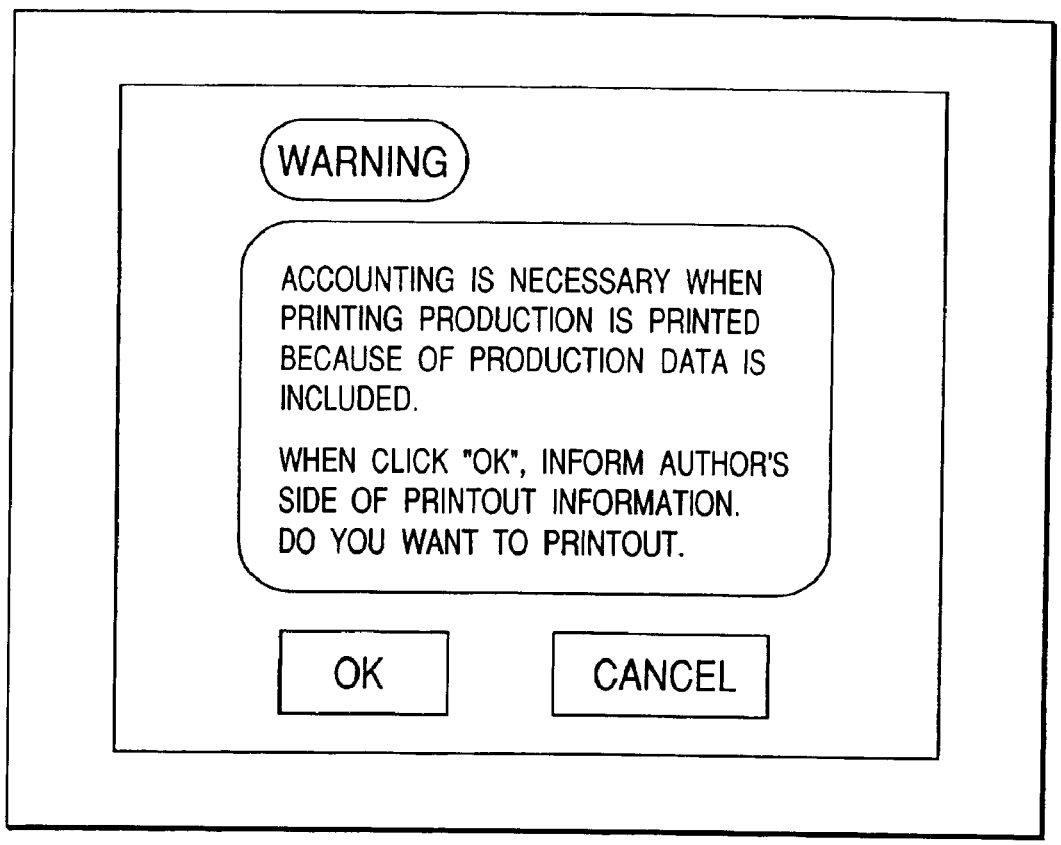
FIG. 18 shows a warning screen for confirming acceptance of accounting of production in the image data processing according to the seventh embodiment of FIG. 7.

Step S1701:

If the concerned image data is production, the system gives the second host computer 1501 the warning to the effect that accounting is imposed if for example such printout as shown in FIG. 18 is executed in order to notifies it of the specified image data (image to be printed out) being production.

This warning screen prompts for the execution of printout of the information (printout information) of image data to be printed out and, at the same time, for acceptance of its automatic posting to the author's side.

Step S1702:

The system decides whether a user's instruction given on the warning screen at stop 1701 indicates acceptance of accounting and printout of the image data.

If the results of this decision indicate user's acceptance for accounting, control goes to the above-mentioned processing starting from step S1212 and, otherwise, goes to step S1703.

Step S1703:

If the user does not accept accounting, the system does not send the image data to the printer 103 but stops the outputting of the image data. Then, this processing is finished.

Steps S1212–S1214:

If, on the other hand, the user accepts accounting, the system, as mentioned above, sends the image data to the printer 103. With this, the printer 103 prints out the concerned image data (i.e., one page of printout). Then, control goes to step S1704.

Step S1704:

This step is executed even when the concerned image data is not production. Therefore, the system decides whether image data printed out by the printer 103 is production.

Only if the results of this decision indicate that the printed out image data is production, control goes to step S1705 and, otherwise, this processing is finished.

Figure 19A:
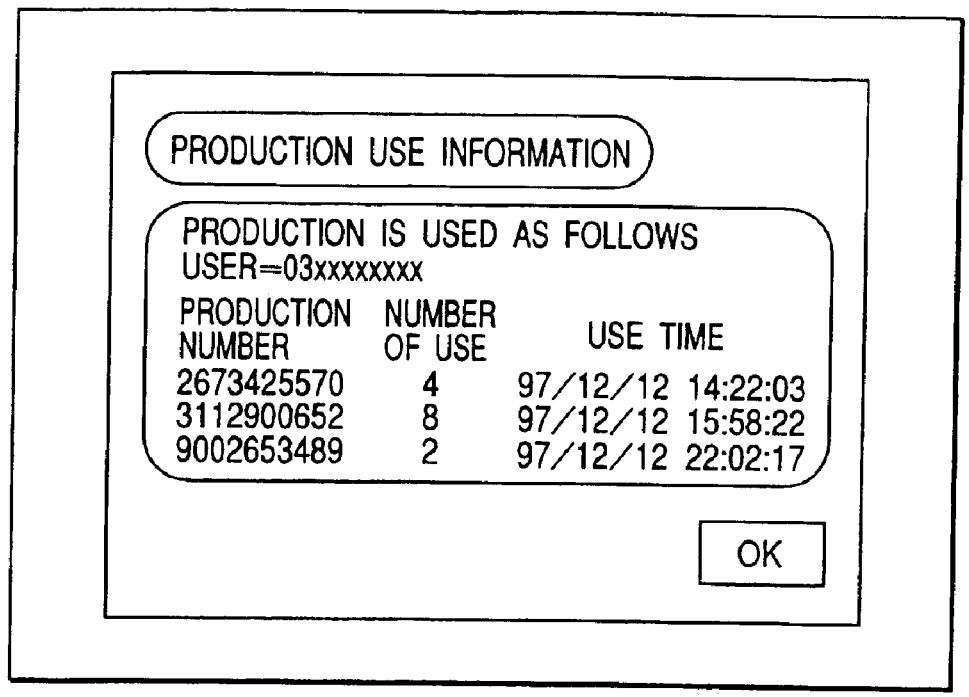
FIGS. 19A and 19B respectively show a screen for displaying production-use information for confirming accounting information of production in the image data processing according to the seventh embodiment of FIG. 7.
Figure 19B:
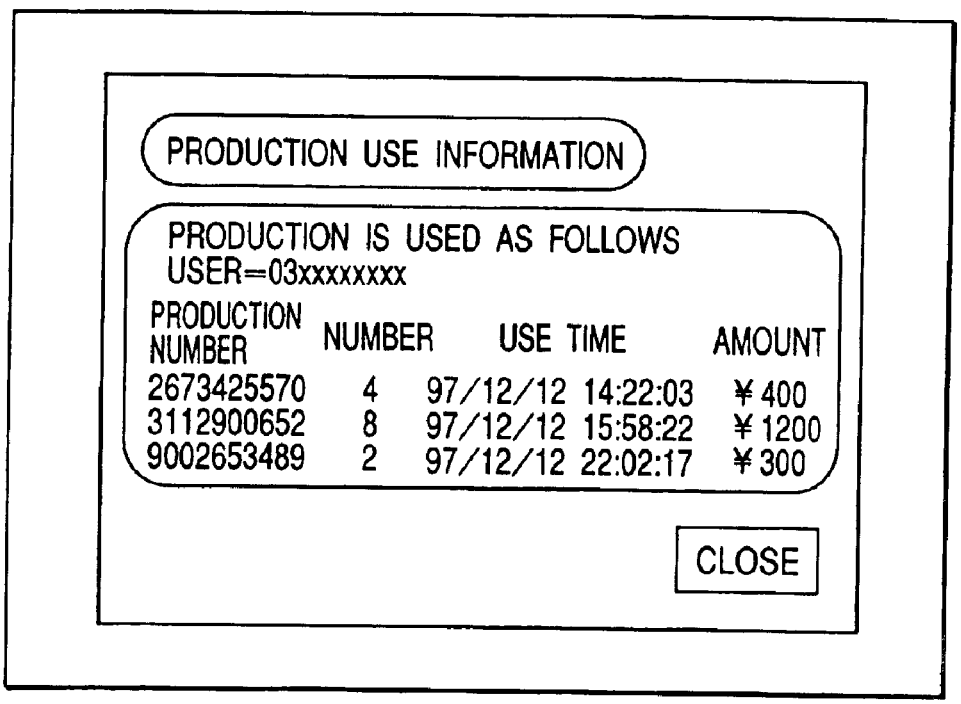

Step S1705:

If the printed out image data is production, the system, for example, causes the user side second host computer 1501 to display output information of the production including accounting information such as shown in FIG. 19B. The system also causes the author's side first computer 1502 to display printout information of the production such as shown in the above-mentioned FIG. 19A. Then, this processing is finished.

Eighth Embodiment

The seventh embodiment has been described in such a case that the author's side host computer performs accounting, to permit production to be printed out.

The eighth embodiment, on the other hand, particularizes, when image data is printed, an author's host computer based on copyright information contained in a form of a digital watermark in the image data, thus making it possible to obtain an image data list relating to the image data to be printed, from this author's side host computer.

Figure 20:
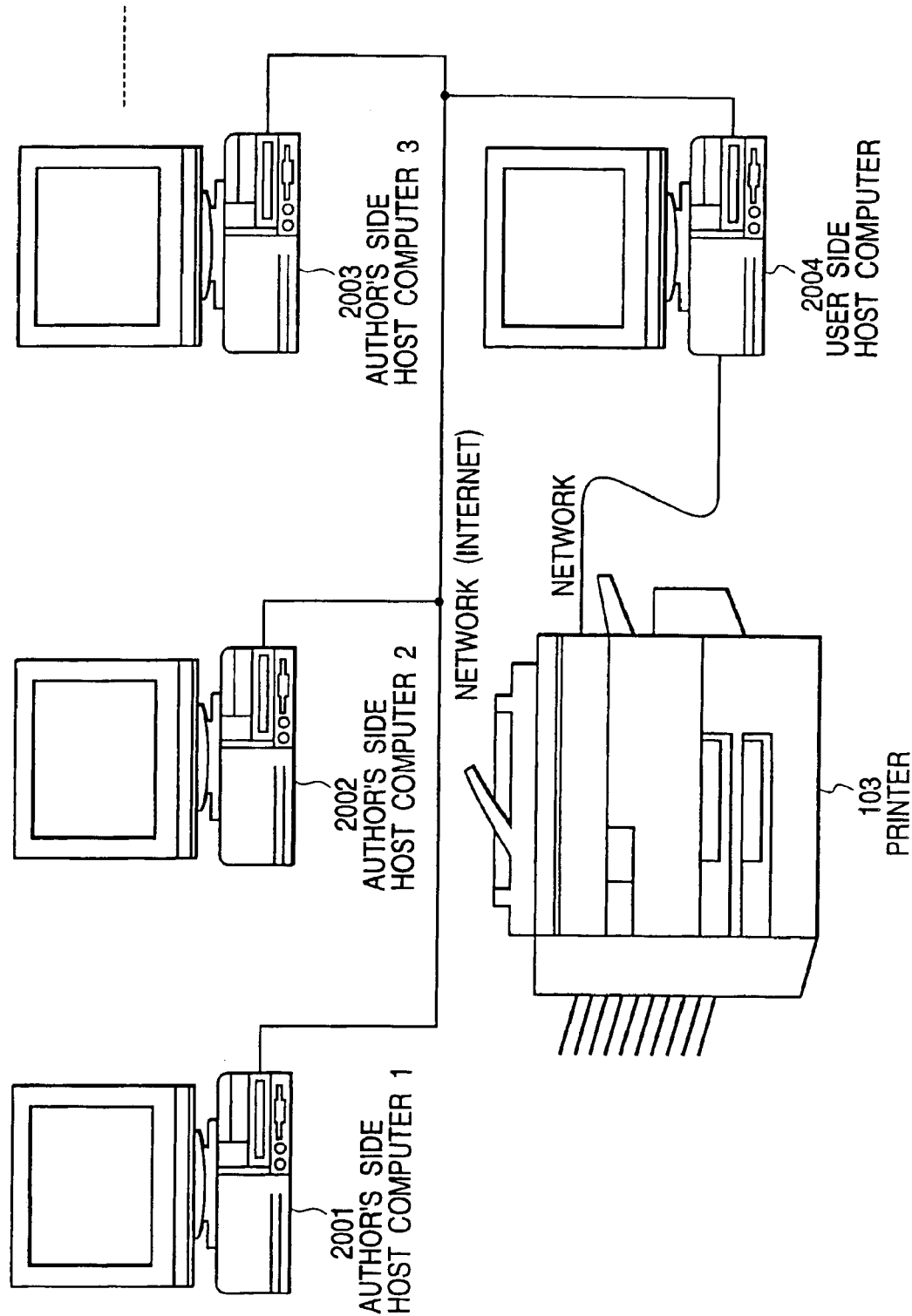
FIG. 20 shows a configuration of an eighth embodiment of the present invention.
Figure 21:
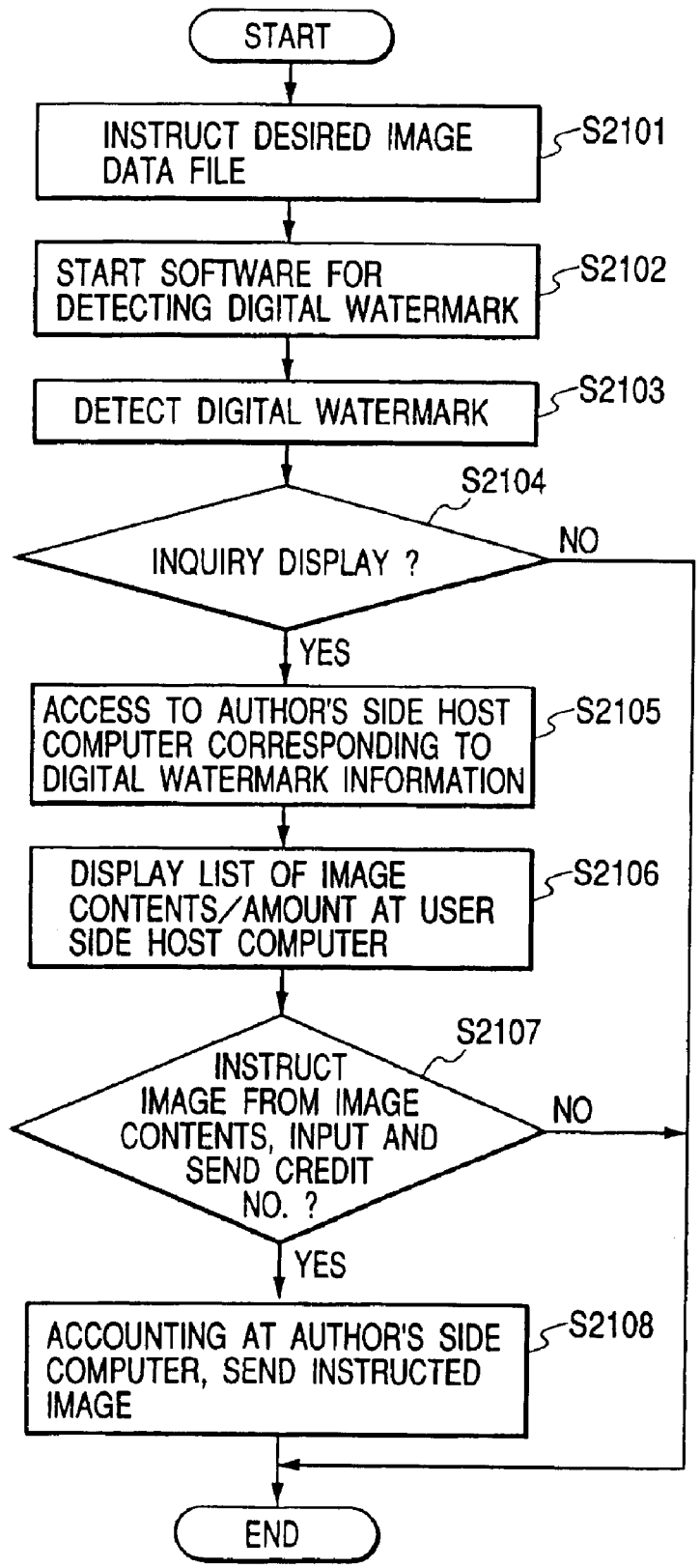
FIG. 21 is a flowchart for the eighth embodiment.

FIG. 20 shows a configuration of the eighth embodiment. FIG. 21 shows a flowchart of the processing by the eighth embodiment.

When it is instructed to print a desired image data file (step S1201), the user side host computer 2004 activates its own software for detecting a digital watermark (which may be embedded into the above-mentioned three bits starting from the LSB or superimposed on a particular frequency in the image) (step S2102), thus detecting the digital watermark embedded in the instructed image data file (step S1203).

Note here that if the digital-watermark detecting software has been activated already, step S2102 can be passed.

Thus detected digital watermark contains information about the above-mentioned image data desired to be printed and also information of the author's side host computer.

The information about this image data desired to be printed is (1) address information of the author's side host computer which manages the copyright of the other paintings if the above-mentioned desired image data is one painting of his, and (2) address information of a host computer which manages the notes of the other melodies of a composer if that desired image data is the document of one of his, and (3) address information of the author's side host computer which manages the other books if that desired image data is one of his, and (4) address information of the author's side host computer which manages the other photographs of a photographer if that desired image data is one of the photographs he took.

Next, the digital-watermark detecting software, based on the information relating to the desired printout image data which is detected, gives the user side host computer 2004 on its display the inquiry for whether it wants to obtain images relating to an image desired to be printed (step S2104).

If the user has replied YES to this inquiry, the user side host computer 2004 uses the address information obtained from the detected digital watermark, to access the home page of the author's side computer 2001 over the Internet (step S2105), thus obtaining an index (the above-mentioned image data list) of the charge of the image contents possessed by the author's computer 2001 as shown in FIG. 23.

Note here that the image contents may not be introduced with their produce names (as shown in FIG. 23) but may be displayed as thumb-nail images (down-sized images).

The user of the user side host computer 2004 selects a desired image from among the above-mentioned index and the thumb-nail images, to enter the credit card number and enter a transmission instruction, thereby causing the author's side host computer 2001 to send the selected image to the user side host computer. Also, the charge for the selected image is accounted to the credit card at the author's side host computer 2001.

Also, if NO is replied at step S2104 or a suspension instruction is given at step S2107, the processing is finished.

The image, when received, is printed by the printer 103.

Although the above-mentioned embodiment separately activates the digital-watermark detecting software, a printer driver, when the user side host computer 2004 instructs printing, may be provided with functions of the digital-watermark detecting software and Internet-connecting software so as to execute processing of step 2103 and the subsequent shown in FIG. 21 in response to a printing instruction.

Also, although the above-mentioned embodiment is limited to a case of still images as image contents received from the author's side computer because of its configuration of printing image data at the printer 103, the contents may be reproduced as movies or musical notes by using the image-reproducing decoding software or speech-reproducing decoding software of the user side host computer.

In this case, the system instructs one frame of image of a movie or an image of the music jacket, to detect a digital watermark for this image, thus executing steps S2105–2108.

Also, although the above-mentioned embodiment has such a configuration so as to receive image contents only from the author's side host computer 2001, when the digital watermark information contains addresses of author's host computers at a plurality of areas (author's side host computers 1, 2, and 3), an index of the image contents and charge may be received from the author's side host computers of the plurality of areas and displayed sequentially at the user side host computer.

Also, if the digital-watermark detecting software takes for its processing execution so long a time (e.g., three seconds or longer) as to inflict some stress on the operator, the system may execute step S2104 after step S2101 in order to execute steps S2102, S2103, S2105, . . . , when YES is replied.

Also, although the flowchart shown in FIG. 21 is used in description, the means for executing the processes shown in FIG. 21 is of course provided to each component shown in FIG. 20.

Also, the above-mentioned embodiment of course can be achieved also by supplying a storage medium which stores a program code for software which realizes the functions of the host computer and its terminals of each of the above-mentioned embodiments to the system or device so that a computer (or CPU or MPU) of that system or device may read out the program code stored in the storage medium and execute it.

In this case, the program code itself read out from the storage medium realizes the functions of each embodiment, so that the storage medium which stores that program code constitutes the present invention.

The storage medium for supplying a program code may come in a ROM, floppy disk, hard disk, optical disk, magneto-optical disk, CD-ROM, CD-R, magnetic tape, non-volatile memory card, etc.

Also, by executing a program code read out by the computer, the functions of each embodiment not only can be realized but also the OS etc. operating at the computer can execute part or all of the actual processes, of course thereby realizing the functions of each embodiment.

Also, after a program code read out from the storage medium is written into a memory provided to a function-expansion unit connected to an expansion-function board inserted into the computer or a function-expansion unit connected to the computer, based on instructions of that program code, the CPU etc. of that function-expansion board or that function-expansion unit may of course execute part of all of the actual processes, thereby realizing the functions of each embodiment.

As described above, the above-mentioned embodiment detects whether predetermined information (which is indicative of production) in image data when that image data is sent from the user side terminal and to be output from an output device (i.e., image forming device, printer, etc.). If the results of this detection indicate the presence of the production information, the system prohibits the outputting of that image data at the output device. In this case, the system causes the user side terminal to for example display a screen which prompts it to enter a password issued from the author's side or confirm that the concerned image data is production, thereby releasing an output-prohibited state of the above-mentioned image data based on information (i.e., information of the entered password or accounting acceptance) returned from the user side terminal. Alternatively, the system sends that information returned from the user side to the author's side terminal, to release an output-prohibited state of the above-mentioned image data based on that returned information (i.e., information of the results of checking the password etc.).

With this, when the user who asked for the outputting of image data which is production has permission from the author's side, an output-prohibited state of that image data is automatically released, thus permitting an output device to output it.

Specifically, a device or system which to protect digitized production and prevent its illegal copying, detects production information (i.e., predetermined information) embedded in that image data to prohibit its output can release a printout-prohibited state of the production when it has obtained permission from the author's side, so that it can making switch-over between a copy-permitted state and a copy-prohibited state according to whether it is authorized to output the production image. Also, it can automatically give accounting to an image which is output production and also causes the author's side and the user to confirm that accounting information locally.

Therefore, it is possible to automatically make switch-over between a copy-permitted state and a copy-prohibited state according to the type of production while securely protecting the production.

What is claimed is:

1. An image processing apparatus which comprises:
    detecting means for detecting digital watermark information in image data;
    obtaining means for obtaining an address of a device which holds a data list relating to said image data from said detected digital watermark information;
    display means for displaying an inquiry as to whether or not a user intends to receive said data list by using said detected digital watermark information;
    data list receiving means for receiving said data list from the device according to said address obtained by said obtaining means;
    data receiving means for receiving data selected by a user from said data list; and
    inquiring means for inquiring, prior to the receiving of said data list by said data list receiving means, whether to perform the receiving of said data list by said data list receiving means in accordance with said detected digital watermark information.

2. The image processing apparatus according to claim 1, wherein said data is an image, a speech, or a movie.

3. The image processing apparatus according to claim 1, wherein said data list has written a plurality of data pieces and charge information for said plurality of data pieces.

4. The image processing apparatus according to claim 1, wherein said data reception is performed by selecting said user's desired data from said data list and inputting the number of a cash card of said user.

5. The image processing apparatus according to claim 1, wherein said data is data of another produce of a painter who has written said image data.

6. The image producing apparatus according to claim 1, wherein said data is data of another produce of a composer who has written a musical note corresponding to said image data.

7. The image processing apparatus according to claim 1, wherein said data is data of another produce of an author who has written a book corresponding to said image data.

8. The image processing apparatus according to claim 1, wherein said data is data of another produce of an photographer who has taken a photograph corresponding to said image data.

9. The image processing apparatus according to claim 1, wherein said address comprises a plurality of addresses, and said data receiving means receives a data list from a plurality of devices.

10. The image processing apparatus according to claim 1, wherein said data is data that has been produced by the same person who created content corresponding to said image data.

11. The image processing apparatus according to claim 10, wherein the content is selected from the group consisting of an image, a painting, music, a book, and a photograph.

12. The image processing apparatus according to claim 1, wherein said data list is an index listing a plurality of items of data, each item of data corresponding to an image, a movie, or sound.

13. The image processing apparatus according to claim 12, wherein said index further lists, for each of the plurality of items of data, a corresponding fee.

14. An image processing method comprising:
   a step of detecting digital watermark information contained in image data by detecting means;
   a step of obtaining an address of a device which holds a data list relating to said image data from said detected digital watermark information by obtaining means;
   a step of controlling display of an inquiry as to whether or not a user intends to receive said data list by using said detected digital watermark information;
   a step of receiving a data list from the device by receiving means according to said address obtained in said obtaining step;
   a step of receiving data selected by a user from said data list by data receiving means; and
   a step of inquiring, prior to the receiving in said data list receiving step, whether to perform the receiving of said data list in said data list receiving step in accordance with said detected digital watermark information.

15. A storage medium for computer-readably storing a program to achieve an image processing method which method comprises:
   a step of detecting digital watermark information contained in image data by detecting means;
   a step of obtaining an address of a device which holds a data list relating to said image data from said detected digital watermark information by obtaining means;
   a step of controlling display of an inquiry as to whether or not a user intends to receive said data list by using said detected digital watermark information;
   a step of receiving a data list from the device by receiving means according to said address obtained in said obtaining step;
   a step of receiving data selected by a user from said data list by data receiving means; and
   a step of inquiring, prior to the receiving in said data list receiving step, whether to perform the receiving of said data list in said data list receiving step in accordance with said detected digital watermark information.

16. A computer-readable program to be used to achieve an image processing method that comprises:
   a step of detecting watermark information contained in image data by detecting means;
   a step of obtaining an address of device which holds a data list relating to said image data from said detected digital watermark information by obtaining means;
   a step of controlling display of an inquiry as to whether or not a user intends to receive said data list by using said detected digital watermark information;
   a step of receiving a data list from the device by receiving means according to said address obtained in said obtaining step;
   a step of receiving data selected by a user from said data list by data receiving means; and
   a step of inquiring, prior to the receiving in said data list receiving step, whether to perform the receiving of said data list in said data list receiving step in accordance with said detected digital watermark information.

* * * * *

UNITED STATES PATENT AND TRADEMARK OFFICE
CERTIFICATE OF CORRECTION

PATENT NO. : 6,914,691 B1
DATED : July 5, 2005
INVENTOR(S) : Akihiko Sato

It is certified that error appears in the above-identified patent and that said Letters Patent is hereby corrected as shown below:

<u>Title page,</u>
Item [56], References Cited, U.S. PATENT DOCUMENTS,
"Zhao, Jian, International Proceesing" should read -- Zhao, Jian, International Proceedings --.
FOREIGN PATENT DOCUMENTS, "2000253241" should read -- 2000/253241 --.

<u>Column 1,</u>
Line 39, "discussed fully" should read -- a full discussion --.
Line 60, "on" should read -- of --.

<u>Column 3,</u>
Line 54, "illuminating" should read -- illuminate --.

<u>Column 4,</u>
Line 6, "electro-statistically" should read -- electrostatically --.
Line 23, "has" should read -- has been --.
Line 25, "as" should read -- a --.
Line 36, "an" should read -- a --.
Line 38, "is" should read -- which is --.
Line 46, "that" should read -- that in which --.

<u>Column 6,</u>
Line 43, "describe" should read -- described --.

<u>Column 7,</u>
Line 20, "byte," should read -- bytes, --.

<u>Column 8,</u>
Line 9, "In it" should read -- it is --; and "any" should read -- some --.
Line 16, "these" should read -- this --.
Line 38, "extracts" should read -- extract --.

<u>Column 9,</u>
Line 16, "In FIG." should read -- FIG. --; and "warning" should read -- a warning --.
Line 19, "to" should read -- to a --; and "date" should read -- data --.

<u>Column 10,</u>
Line 27, "there" should read -- here --.
Line 35, "raster image processing" should read -- raster-image processed --.
Line 46, "ad," should read -- and, --.

UNITED STATES PATENT AND TRADEMARK OFFICE
CERTIFICATE OF CORRECTION

PATENT NO.   : 6,914,691 B1
DATED        : July 5, 2005
INVENTOR(S)  : Akihiko Sato It is certified that error appears in the above-identified patent and that said Letters Patent is hereby corrected as shown below:

Column 11,
Line 14, "device 103;" should read -- device 103, --.
Line 48, "image" should read -- of image --.

Column 13,
Line 13, "permits" should read -- permit --.
Line 31, "mage" should read -- image --.
Line 53, "decides" should read -- decide whether --.
Line 66, "mistook" should read -- made a mistake --.

Column 14,
Lines 4 and 7, "mistook" should read -- made a mistake in --.
Line 9, "prevent" should read -- prevented --.
Line 12, "because" should read -- because of a --.
Line 16, "all" should be deleted.
Line 48, "the" should read -- is --.

Column 15,
Line 2, "ion" should read -- in --.
Line 6, "If, as" should read -- As --.
Line 26, "an" should read -- a --.
Line 37, "perform" should read -- performs --.
Line 45, "detect," should read -- detect --.

Column 16,
Line 17, "side the" should read -- side --.
Line 44, "mage" should read -- image --.
Line 53, "does" should be deleted.

Column 17,
Line 14, "a the" should be deleted.
Line 36, "notifies" should read -- notify --.

UNITED STATES PATENT AND TRADEMARK OFFICE
CERTIFICATE OF CORRECTION

PATENT NO. : 6,914,691 B1
DATED : July 5, 2005
INVENTOR(S) : Akihiko Sato

It is certified that error appears in the above-identified patent and that said Letters Patent is hereby corrected as shown below:

<u>Column 20,</u>
Line 7, "whether" should read -- whether there is --.
Line 9, "and" should be deleted.
Line 31, "which" should be deleted.

Signed and Sealed this

Sixteenth Day of May, 2006

JON W. DUDAS
*Director of the United States Patent and Trademark Office*